United States Patent
Mitcheson et al.

(10) Patent No.: US 10,381,876 B2
(45) Date of Patent: Aug. 13, 2019

(54) INDUCTIVE POWER TRANSFER SYSTEM

(71) Applicants: Paul David Mitcheson, London (GB); James Lawson, London (GB); Manuel Pinuela Rangel, London (GB); David Christopher Yates, London (GB)

(72) Inventors: Paul David Mitcheson, London (GB); James Lawson, London (GB); Manuel Pinuela Rangel, London (GB); David Christopher Yates, London (GB)

(73) Assignee: DRAYSON TECHNOLOGIES (EUROPE) LIMITED, London (GB)

(*) Notice: Subject to any disclaimer, the term of this patent is extended or adjusted under 35 U.S.C. 154(b) by 31 days.

(21) Appl. No.: 14/952,097

(22) Filed: Nov. 25, 2015

(65) Prior Publication Data
US 2016/0204645 A1    Jul. 14, 2016

Related U.S. Application Data

(63) Continuation of application No. PCT/GB2014/051656, filed on May 30, 2014.

(30) Foreign Application Priority Data

May 30, 2013   (GB) .................................. 1309691.2
May 31, 2013   (WO) ............... PCT/GB2013/051456
Dec. 2, 2013   (GB) .................................. 1321267.5

(51) Int. Cl.
*H02J 7/00*   (2006.01)
*H02J 50/12*  (2016.01)
(Continued)

(52) U.S. Cl.
CPC .............. *H02J 50/12* (2016.02); *H02J 7/025* (2013.01); *H02J 17/00* (2013.01); *H02J 50/70* (2016.02);
(Continued)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS 1,119,732 A   12/1914 Tesla ............................ 343/850
5,200,672 A    4/1993 Sheynberg et al.
(Continued)

FOREIGN PATENT DOCUMENTS

CA    2 715 937 A1    9/2010
CN    102150340 A     8/2011
(Continued)

OTHER PUBLICATIONS

Agilent Technologies, Inc., "Agilent N2780A/B, N2781A/B, N2782A/B, and N2783A/B Current Probes, User's and Service Guide," Fifth Edition, 46 pages, Aug. 2010.
(Continued)

*Primary Examiner* — Arun C Williams
(74) *Attorney, Agent, or Firm* — Nutter McClennen & Fish LLP

(57) ABSTRACT

The invention relates to an inductive power transfer transmitter comprising class-E amplifier driver arranged to drive a primary tank circuit including a transmitter coil, in which the driver frequency is tuned to drive the primary tank circuit when the primary tank circuit is in an unloaded condition.

17 Claims, 36 Drawing Sheets

(51) Int. Cl.

| | |
|---|---|
| *H02J 7/02* | (2016.01) |
| *H02J 50/70* | (2016.01) |
| *H02J 50/90* | (2016.01) |
| *H02J 17/00* | (2006.01) |
| *H02M 7/537* | (2006.01) |
| *H02M 7/48* | (2007.01) |

(52) U.S. Cl.
CPC ............ *H02J 50/90* (2016.02); *H02M 7/537* (2013.01); *H02M 2007/4815* (2013.01); *Y02B 70/1441* (2013.01)

(58) Field of Classification Search
USPC ....................................................... 320/108
See application file for complete search history.

(56) References Cited

U.S. PATENT DOCUMENTS

| | | | |
|---|---|---|---|
| 5,327,337 | A | 7/1994 | Cripe |
| 5,525,871 | A | 6/1996 | Bray et al. |
| 7,956,572 | B2 | 6/2011 | Zane et al. |
| 9,425,653 | B2 | 8/2016 | Cook et al. |
| 2002/0101284 | A1 | 8/2002 | Kee et al. |
| 2007/0145830 | A1 | 6/2007 | Lee et al. |
| 2009/0218884 | A1 | 9/2009 | Soar |
| 2010/0109443 | A1 | 5/2010 | Cook et al. |
| 2010/0123451 | A1 | 5/2010 | Freer ............................ 323/356 |
| 2010/0184371 | A1 | 7/2010 | Cook et al. |
| 2010/0283327 | A1 | 11/2010 | Buschnakowski et al. |
| 2011/0046699 | A1 | 2/2011 | Mazanec |
| 2011/0080056 | A1 | 4/2011 | Low et al. |
| 2011/0084656 | A1 | 4/2011 | Gao |
| 2011/0089894 | A1 | 4/2011 | Soar |
| 2011/0221278 | A1 | 9/2011 | Karalis et al. ................ 307/104 |
| 2012/0032632 | A1 | 2/2012 | Soar |
| 2012/0062345 | A1 | 3/2012 | Kurs et al. |
| 2012/0161538 | A1 | 6/2012 | Kinoshita et al. |
| 2012/0206097 | A1 | 8/2012 | Soar |
| 2012/0223589 | A1* | 9/2012 | Low ..................... H04B 5/0037 307/104 |
| 2012/0235636 | A1* | 9/2012 | Partovi ................... H02J 7/025 320/108 |
| 2013/0005251 | A1 | 1/2013 | Soar |
| 2013/0015813 | A1 | 1/2013 | Kim et al. ..................... 320/108 |
| 2013/0082535 | A1* | 4/2013 | Miyauchi ............ H04B 5/0093 307/104 |
| 2013/0188408 | A1 | 7/2013 | Yamamoto |
| 2014/0252877 | A1* | 9/2014 | Turki ...................... H02J 5/005 307/104 |

FOREIGN PATENT DOCUMENTS

| | | |
|---|---|---|
| EP | 0 503 862 A2 | 3/1992 |
| EP | 0 643 900 A1 | 3/1995 |
| EP | 2 670 023 A1 | 12/2013 |
| EP | 2 670 037 A1 | 12/2013 |
| GB | 2493671 A | 2/2013 |
| JP | 7-143750 A2 | 6/1995 |
| JP | 2012-503469 A | 2/2012 |
| SG | 182745 A1 | 8/2012 |
| WO | WO 2007/000055 A1 | 1/2007 |
| WO | WO 2009/070730 A2 | 6/2009 |
| WO | WO 2010/033727 A2 | 3/2010 |
| WO | WO 2010/137495 A1 | 12/2010 |
| WO | WO 2011/044695 A1 | 4/2011 |
| WO | WO 2011/091528 A1 | 8/2011 |
| WO | WO 2011/134068 A1 | 11/2011 |
| WO | WO 2012/016336 A2 | 2/2012 |
| WO | WO 2012/027824 A1 | 3/2012 |
| WO | WO 2012/092183 A2 | 7/2012 |
| WO | WO 2012-101905 A | 8/2012 |
| WO | WO 2012-101907 A | 8/2012 |
| WO | WO 2013/014521 A1 | 1/2013 ............. H03F 3/217 |
| WO | WO 2014/029961 A1 | 2/2014 |

OTHER PUBLICATIONS

Ahn et al., "Magnetic Field Design for High Efficient and Low EMF Wireless Power Transfer in On-Line Electric Vehicle," Proceedings of the 5$^{th}$ European Conference on Antennas and Propagation, pp. 3979-3982, Apr. 11-15, 2011.

Balanis, "Antenna Theory: Analysis and Design," 3$^{rd}$ Edition, John Wiley and Sons, Inc., 1166 pages, 2005.

Budhia et al., "Design and Optimization of Circular Magnetic Structures for Lumped Inductive Power Transfer Systems," IEEE Transactions on Power Electronics, vol. 26, No. 11, pp. 3096-3108, Nov. 2011.

Butterworth, "Alternating Current Resistance of Solenoidal Coils," Proceedings of the Royal Society of London. Series A, Containing Papers of a Mathematical and Physical Character, vol. 107, No. 744, pp. 693-715, Apr. 1, 1925.

Casanova et al., "Design and Optimization of a Class-E Amplifier for a Loosely Coupled Planar Wireless Power System," IEEE Transactions on Circuits and Systems—II: Express Briefs, vol. 56, No. 11, pp. 830-834, Nov. 10, 2009.

Chen et al., "An Optimizable Circuit Structure for High-Efficiency Wireless Power Transfer," IEEE Transactions on Industrial Electronics, vol. 60, No. 1, pp. 339-349, Sep. 6, 2012.

Covic et al., "The design of a contact-less energy transfer system for a people mover system," Proceedings of the International Conference on Power System Technology, PowerCon, vol. 1, pp. 79-84, Dec. 4-7, 2000.

Delphi, Delphi Wireless Charging System, http://delphi.com/shared/pdf/ppd/pwrelec/wireless-charging-system.pdf, 4 pages, 2012.

Duong et al., "Experimental Results of High-Efficiency Resonant Coupling Wireless Power Transfer Using a Variable Coupling Method," IEEE Microwave and Wireless Components Letters, vol. 21, No. 8, pp. 442-444, Aug. 10, 2011.

Garnica et al., "High Efficiency Midrange Wireless Power Transfer System," Microwave Workshop Series on Innovative Wireless Power Transmission: Technologies, Systems, and Applications, pp. 73-76, May 12-13, 2011.

HaloIPT, Wireless Charging for Electric Vehicles, http://www.haloipt.com/#nhome-intra, 1 page, Feb. 2012.

Huh et al., "Narrow-Width Inductive Power Transfer System for Online Electrical Vehicles," IEEE Transactions on Power Electronics, vol. 26, No. 12, pp. 3666-3679, Dec. 6, 2011.

Hui et al., "A New Generation of Universal Contactless Battery Charging Platform for Portable Consumer Electronic Equipment," 35$^{th}$ Annual IEEE Power Electronics Specialists Conference, Aachen, Germany, pp. 638-644, 2004.

Kajfez et al., "Uncertainty Analysis of the Transmission-Type Measurement of Q-Factor," IEEE Transactions on Microwave Theory and Techniques, vol. 47, No. 3, pp. 367-371, Mar. 1999.

Karalis et al., "Efficient wireless non-radiative mid-range energy transfer," Annals of Physics, vol. 323, pp. 34-48, Apr. 27, 2007.

Kim et al., "Automated Frequency Tracking System for Efficient Mid-Range Magnetic Resonance Wireless Power Transfer," Microwave and Optical Technology Letters, vol. 54, No. 6, pp. 1423-1426, Jun. 2012.

Kurs et al., "Wireless Power Transfer via Strongly Coupled Magnetic Resonances," Science, vol. 317, pp. 83-86, Jul. 6, 2007.

Lawson et al., "Long range inductive power transfer system," Journal of Physics: Conference Series, vol. 476, 6 pages, 2013.

Lee et al., "Development and Validation of Model for 95% Efficiency, 220 W Wireless Power Transfer over a 30cm Air-gap," IEEE Transactions on Industry Applications, vol. 47, No. 6, pp. 885-892, Nov./Dec. 2011.

Low et al., "Design and Test of a High-Power High-Efficiency Loosely Coupled Planar Wireless Power Transfer System," IEEE Transactions on Industrial Electronics, vol. 56, No. 5, pp. 1801-1812, Apr. 29, 2009.

Pinuela et al., "Maximising the Link Efficiency of Resonant Inductive Coupling for Wireless Power Transfer," 1$^{st}$ International Workshop on Wireless Energy Transport and Harvesting, Eindhoven, The Netherlands, 4 pages, Jun. 28, 2011.

(56) References Cited

OTHER PUBLICATIONS

Plugless Power, Plugless Power™, Unleash your EV, www.pluglesspower.com, 4 pages, Feb. 2012.
Qualcomm, Wireless Technology & Innovation, Qualcomm, http://www.qualcomm.com, 4 pages, Dec. 7, 2016.
Rea et al., "Thermal Radiation from Finned Heat Sinks," IEEE Transactions on Parts, Hybrids, and Packaging, vol. PHP-12, No. 2, pp. 115-117, Jun. 1976.
Sample et al., "Analysis, Experimental Results, and Range Adaptation of Magnetically Coupled Resonators for Wireless Power Transfer," IEEE Transactions on Industrial Electronics, vol. 58, No. 2, pp. 544-554, Jan. 12, 2011.
Schneider, "Electrons Unplugged: Wireless power at a distance is still far away," IEEE Spectrum, vol. 47, No. 5, pp. 35-39, May 2010.
Schuylenbergh et al., "Inductive Powering: Basic Theory and Application to Biomedical Systems," Springer, 3 pages, Jul. 2009.
Sokal et al., "Class E—A New Class of High-Efficiency Tuned Single-Ended Switching Power Amplifiers," IEEE Journal of Solid-State Circuits, vol. SC-10, No. 3, pp. 168-176, Jun. 1975.
Sokal, "Class-E RF Power Amplifiers," QEX Communications Quarterly, vol. 204, pp. 9-20, Jan./Feb. 2001.
Vania, "PRF-1150 1KW 13.56 MHz Class E RF Generator Evaluation Module," Directed Energy, Inc. Technical Note, Document No. 9200-0255 Rev 1, 2002.
Villa et al., "High-Misalignment Tolerant Compensation Topology for ICPT Systems," IEEE Transactions on Industrial Electronics, vol. 59, No. 2, pp. 945-951, Oct. 18, 2011.
Wang et al., "Experiments on Wireless Power Transfer with Metamaterials," Applied Physics Letters, vol. 98, 5 pages, Jun. 20, 2011.
WiTricity Corp., WiTricity Corp. Home—Wireless Electricity Delivered Over Distance, www.witricity.com, 1 page, Feb. 2012.
Yates et al., "Optimal Transmission Frequency for Ultralow-Power Short-Range Radio Links," IEEE Transactions on Circuits and Systems—I: Regular Papers, vol. 51, No. 7, pp. 1405-1413, Jul. 2004.
International Searching Authority, International Search Report—International Application No. PCT/GB2014/051656, dated Sep. 16, 2014, together with the Written Opinion of the International Searching Authority, 7 pages.
Canadian Intellectual Property Office, Official Action, Canadian patent application No. 2,817,288, 8 pages, dated Mar. 2, 2018.
Japanese Patent Office, Corrected Office Action—Notice of Reasons for Rejection pertaining to Japanese Application No. 2015-527959, dated Jan. 9, 2018, 7 pages (English Translation).
Chinese Patent Office, Office Action—pertaining to Chinese Patent Application No. 201380052106.X, dated Apr. 10, 2018, 4 pages.
Chinese Patent Office, Office Action—pertaining to Chinese Patent Application No. 201380052106.X, dated Apr. 10, 2018, 6 pages (English Translation).
Erickson et al., "Design of a Simple High-Power-Factor Rectifier Based on the Flyback Converter", APEC '90, Conference Proceedings of Fifth Annual Applied Power Electronics Conference and Exposition, pp. 792-801, Mar. 11-16, 1990.
Erickson et al., "Fundamentals of Power Electronics—Second Edition," Kluwer Academic Publishers, 881 pages, 2004.
Finkenzeller, "RFID Handbook, Fundamental and Applications in Contactless Smart Cards, Radio Frequency Identification and Near-Field Communication—Third Edition", Wiley, ISBN 0-470-84402-7, 480 pages, 2010.
Garnica et al., "Wireless Power Transmission: From Far Field to Near Field", Proceedings of the IEEE, vol. 101, No. 6, pp. 1321-1331, Jun. 2013.
Grebennikov, "High-Efficiency Class E/F Lumped and Transmission-Line Power Amplifiers", IEEE Transactions on Microwave Theory and Techniques, vol. 59, No. 6, pp. 1579-1588, Jun. 2011.
IMPI (Mexican Institute of Industrial Property), Examination Report for Mexican Application No. MX/a/2013/006253, dated Apr. 23, 2015, 2 pages.

IMPI (Mexican Institute of Industrial Property), Examination Report for Mexican Application No. MX/a/2013/006253, dated Apr. 23, 2015, 2 pages (English translation).
IMPI (Mexican Institute of Industrial Property), Examination Report for Mexican application MX/a/2013/006253, dated Jul. 3, 2015, 3 pages.
IMPI (Mexican Institute of Industrial Property), Examination Report for Mexican application MX/a/2013/006253, dated Jul. 3, 2015, 3 pages (English translation).
International Searching Authority, International Search Report—International Application No. PCT/GB2013/051456, dated Nov. 20, 2013, 3 pages.
International Bureau of WIPO, International Preliminary Report on Patentability for PCT/GB2013/051456, dated Mar. 5, 2015, 7 pages.
Japanese Patent Office, Office Action—Notice of Reasons for Rejection pertaining to Japanese Application No. 2015-527959, dated Apr. 25, 2017, 6 pages.
Japanese Patent Office, Office Action—Notice of Reasons for Rejection pertaining to Japanese Application No. 2015-527959, dated Apr. 25, 2017, 5 pages (English Translation).
Jow et al., "Design and Optimization of Printed Spiral Coils for Efficient Transcutaneous Inductive Power Transmission", 2007 IEEE Transactions on Biomedical Circuits and Systems, vol. 1, No. 3, pp. 193-202, Sep. 2007.
Kaczmarczyk, "High-Efficiency Class E. EF2 and E/F3 Inverters", IEEE Transactions on Industrial Electronics, vol. 53, No. 5, pp. 1584-1593, Oct. 2006.
Kajfez, "Q factor measurements, analog and digital", http://www.ee.olemiss.edu/darko/rfqmeas2b.pdf, 18 pages, 1999.
Kazimierczuk et al., "Class E DC/DC Converters with an Inductive Impedance Inverter", IEEE Transactions on Power Electronics, vol. 4, No. 1, pp. 124-135, Jan. 1989.
Kee et al., "The Class E/F family of ZVS Switching Amplifiers", IEEE Transactions on Microwave Theory and Techniques, vol. 51, No. 6, pp. 1677-1690, Jun. 2003.
Kuhn et al., "Measuring and Reporting High Quality Factors of Inductors Using Vector Network Analyzers", 2010 IEEE Transactions on Microwave Theory and Techniques, vol. 58, No. 4, pp. 1046-1055, Apr. 2010.
Lee et al., "Surface Spiral Coil Design Methodologies for High Efficiency, High Power, Low Flux Density, Large Air-Gap Wireless Power Transfer Systems", Twenty-Eighth Annual IEEE Applied Power Electronics Conference and Exposition (APEC), pp. 1783-1790, 2013.
Mediano et al., "Class-E RF Power Amplifier with a Flat-Top Transistor-Voltage Waveform", IEEE MTT-S International Microwave Symposium Digest (MTT), pp. 1-3, 2012.
Mitcheson et al., "Tuning the Resonant Frequency and Damping of an Electromagnetic Energy Harvester Using Power Electronics", IEEE Transactions on Circuits and Systems II: Express Briefs, vol. 58, No. 12, pp. 792-796, Dec. 2011.
Paing et al., "Resistor Emulation Approach to Low-Power Energy Harvesting", 37th IEEE Power Electronics Specialists Conference, (PESC '06), pp. 1-7, 2006.
Pinuela et al., "Current State of Research at Imperial College London in RF Harvesting and Inductive Power Transfer", Conference paper published on Mar. 12, 2012, 2nd International Workshop on Wireless Energy Transport and Harvesting, 24 pages, 2012.
Pinuela et al., "Maximising DC to Load Efficiency for Inductive Power Rransfer", IEEE Transactions on Power Electronics, vol. 28, No. 5, pp. 2437-2447, 2012.
Raab, "Idealized Operation of the Class E Tuned Power Amplifier", IEEE Transactions on Circuits and Systems, vol. 24, No. 12, pp. 725-735, Dec. 1977.
Ramo et al., "Fields and Waves in Communication Electronics", John Wiley & Sons, Inc. ISBN 978-0471585510, 858 pages, Jul. 1994.
Rivas et al., "A High-Frequency Resonant Inverter Topology With Low-Voltage Stress", IEEE Transactions on Power Electronics, vol. 23, No. 4, pp. 1759-1771, 2007.
Strassner et al., "Microwave Power Transmission: Historical Milestones and System Components", Proceedings of the IEEE, vol. 101, No. 6, pp. 1379-1396, Jun. 2013.

(56) References Cited

OTHER PUBLICATIONS

Terman, "Radio Engineer's Handbook", McGraw-Hill Book Company, Inc., 1036 pages, 1943.
UK Intellectual Property Office, Search and Examination Report for UK Application No. GB 1215152.8, dated Dec. 6, 2012, 5 pages.
UK Intellectual Property Office, Search and Examination Report for UK Application No. GB 1309691.2, dated Dec. 3, 2013, 11 pages.
UK Intellectual Property Office, Search Report for UK Application No. GB 1321267.5, dated Jun. 13, 2014, 5 pages.
United States Patent and Trademark Office, Office Action dated Jun. 19, 2017 pertaining to U.S. Appl. No. 14/952,097, 10 pages.
Vandevoorde et al., "Wireless energy transfer for stand-alone systems: a comparison between low and high power applicability", Elsevier, Sensors and Actuators A: Physical, vol. 92, Issues 1-3, pp. 305-311, Aug. 2001.
Visser, "Aspects of Far-Field RF Energy Transport", Proceedings of the $42^{nd}$ European Microwave Conference (EuMC), pp. 317-320, Oct. 29-Nov. 1, 2012.
Zulinski et al., "Idealized Operation of Class E Frequency Multipliers", IEEE Transactions on Circuits and Systems, vol. CAS-33, No. 12, Dec. 1986.
Zulinski et al., "Class E Power Amplifiers and Frequency Multipliers with Finite DC-Feed Inductance", IEEE Transactions on Circuits and Systems, vol. CAS-34, No. 9, pp. 1074-1087, Sep. 1987.
Wang D., "Overview of DC-DC Inverter," 1993 Proceedings of the Symposium on Electrical Theory, South China of University Technology, 6 pages.
Wang D., "Overview of DC-DC Inverter," 1993 Proceedings of the Symposium on Electrical Theory, South China University of Technology, 11 pages (English translation).

\* cited by examiner

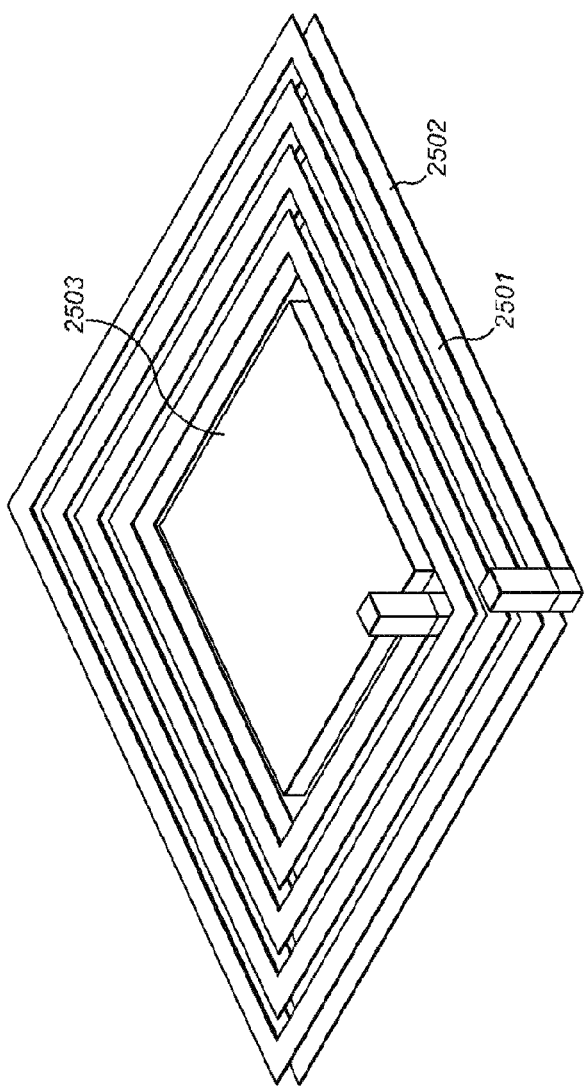

though this approach was not considered efficient, since low driver
INDUCTIVE POWER TRANSFER SYSTEM This invention relates to an inductive power transfer system. In general terms this application relates to maximising DC to load efficiency for inductive power transfer.

BACKGROUND

Inductive power transfer (IPT) without a magnetic core was first proposed by Nikola Tesla to supply wireless mains power over long distances around 100 years ago [1]. Since then, low-power, closely-coupled wireless charging methods have been used to power medical implants [2], while the wireless powering of portable devices through charging mats is now available via commercial products [3]. Nonetheless, there has been recent interest in wireless power transfer (WPT) for medium range (i.e. 10 s of cm) applications, such as electric vehicle charging through resonant inductive coupling [4]-[7].

For many industrial and commercial applications, IPT systems must be capable of achieving a high end-to-end efficiency gee, while transferring hundreds of watts at sub-meter distances, otherwise they will not be adopted. Several approaches for achieving good link efficiencies have been developed by several research groups. The first is to work at relatively low frequencies (tens of kHz), where efficient driver circuits can be easily realised and by increasing the coupling factor k of the system, using field-shaping techniques; for example, by employing metamaterials [8] and ferrite cores [6]. In [6], 2 kW of power was transferred at a distance of 10 cm using Litz wire coils at 20 kHz. The operating frequency was defined by the power handling capabilities of the coil driver, limiting the maximum coil unloaded Q-factor to 290. Field-shaping techniques normally occupy useful volume, require heavy materials, employ expensive fabrication techniques and need a precise coil alignment. These solutions make the field-shaping approach unsuitable for many applications, where the size, weight and cost of the system are limiting factors.

The second approach relies on transferring energy at the optimum frequency for maximum power transfer given a particular coil size, where the unloaded Q is maximised and compensates for the low coupling factor. In the past, this approach was not considered efficient, since low driver efficiency (due to semiconductor losses) dramatically reduced the end-to-end efficiency of the IPT system. An example of this was described by Kurs et al. [9], where the use of a 9.9 MHz Colpitts oscillator driver achieved an end-to-end efficiency of only 15%, when the transfer efficiency was 50%.

Other attempts at this approach have been successful, with the use of commercially-off-the-shelf (COTS) equipment to drive and impedance match the TX coils at frequencies above 3 MHz and with ηtransfer=95%, while also reducing the coil losses by using a surface spiral [10].

The highest ηee have been demonstrated by the commercial IPT systems currently available on the market. High efficiencies of ηee=90% have been achieved at distances of less than 30 cm but with relatively heavy systems (30-40 kg) that use field shaping ferromagnetic materials. In contrast, a system with frequency tracking and no ferromagnetic materials was used in [11], where an estimated ηdc-load=70% was calculated. Here, no clear description of the driver's efficiency is given, as it is based on a COTS 50Ω system with added TX and RX loops. Emphasis was again given to the control of the link and transfer efficiency, rather than the dc-to-load efficiency. Other interesting attempts to increase the end-to-end efficiency have been presented in [12], [13], where ηee>60% have been achieved at close proximity.

Improved systems will provide a high frequency, cost effective and efficient solution for mid-range IPT in the absence of field-shaping techniques, allowing a light-weight system to be achieved. A system with a TX-RX coil size difference represents a more realistic system, where the receiver size is usually constrained by its application. This system should be able to achieve high efficiency for lower coupling factors, due to the smaller RX coil size. Furthermore, this system should be able to achieve high efficiencies even under situations where perfect alignment is not always achievable (e.g. electric vehicle or wireless sensor charging).

BRIEF SUMMARY OF THE DISCLOSURE

The invention is set out in the claims.
The invention extends to the receiver circuit of the inductive power transfer system. The invention extends to the transmitter circuit of the inductive power transfer system.

BRIEF DESCRIPTION OF THE DRAWINGS

Embodiments of the invention are further described hereinafter with reference to the accompanying drawings, in which:

FIG. 25 shows a potential receive coil configuration;

DETAILED DESCRIPTION

Inductive Power Transfer (IPT) systems for transmitting tens to hundreds of watts have been reported for almost a decade. Most of the work has concentrated on the optimization of the link efficiency and has not taken into account the efficiency of the driver. Class-E amplifiers have been identified as ideal drivers for IPT applications, but their power handling capability at tens of MHz has been a crucial limiting factor, since the load and inductor characteristics are set by the requirements of the resonant inductive system. The frequency limitation of the driver restricts the unloaded Q factor of the coils and thus the link efficiency. With a suitable driver, copper coil unloaded Q factors of over 1,000 can be achieved in the low MHz region, enabling a cost-effective high Q coil assembly. The system described herein alleviates the use of heavy and expensive field-shaping techniques by presenting an efficient IPT system capable of transmitting energy with a dc-to-load efficiency above 77% at 6 MHz across a distance of 30 cm. This is believed to be the highest dc-to-load efficiency achieved for an IPT system without introducing restrictive coupling factor enhancement techniques.

Figure 1:
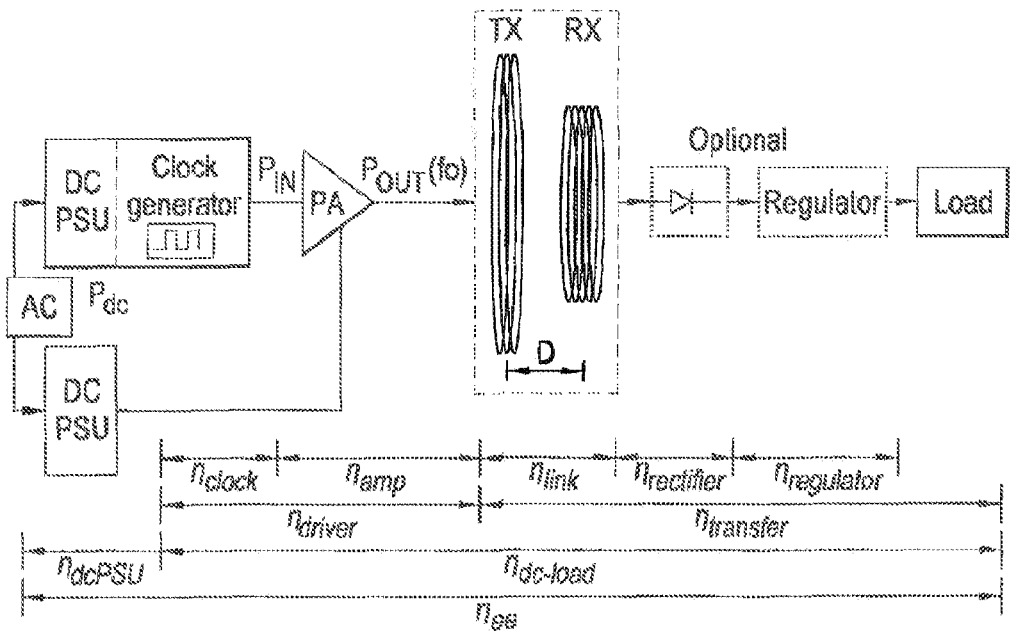
FIG. 1 shows an inductive power transfer system architecture.

A basic IPT system architecture comprises several modules, as illustrated in FIG. 1. The architecture includes DC power supply units (PSUs), coil driver (i.e. clock generator and power amplifier (PA) having an impedance matching network), transmitting (TX) coil with separation distance D from a receiving (RX) coil (measured from the centre-to-centre of the coils), an optional rectifier/regulator and a load. To fully characterize the complete system, the end-to end efficiency gee of all the building blocks, from the AC source to the load, can be considered as $\eta ee=\eta dc\text{-}PSU\eta dc\text{-}load$, where the efficiency terms are shown in FIG. 1. In FIG. 1, $\eta dc\text{-}load=\eta driver\eta transfer$, $\eta driver=\eta clock\eta amp$, $\eta dc\text{-}PSU$ is the combined efficiency of the dc power supplies, $\eta dc\text{-}load$ is the dc-to-load efficiency, $\eta driver$ is the efficiency of the driver, $\eta link$ is the link efficiency, $\eta transfer$ is the transfer efficiency, $\eta clock$ is the efficiency of the driver clock, $\eta amp$ is the efficiency of the power amplifier, $\eta rectifier$ is the rectifier efficiency and $\eta regulator$ is the efficiency of the regulator. The present invention focuses on optimizing $\eta dc\text{-}load$ for an IPT system without a rectifier or regulator, i.e. maximising: $\eta dc\text{-}load=Pload/Pdc$ where Pdc is the total DC input power to the system (i.e. into the clock and power amplifier) and Pload is the real power dissipated in the load.

It is important that consistent, well-defined figures of merit, such as qdc-load and gee, are used to evaluate IPT systems to allow a straightforward comparison of the different emerging technologies in this field. From the IPT systems architecture in FIG. 1, the transfer efficiency just describes part of the system's efficiency and does not take into account the driver.

The table below shows comparisons of the state of the art in IPT systems. In the table qtransfer, $\eta dc\text{-}load$ and gee have been separated out, where possible, to highlight that dc to-load efficiency can be substantially lower than the transfer efficiency.

| D [cm] | fo [kHz] | Driver Technology | Coil Technology | Magnetic Material | $P_{load}$ [W] | $\eta_{transfer}$ [%] | $\eta_{dc\text{-}load}$ [%] | $\eta_{ee}$ [%] | Ref. |
|---|---|---|---|---|---|---|---|---|---|
| 0 | 134 | Class-E | Litz wire | No | 295 | — | — | 75.7 | [12] |
| 0 | 240 | Class-E | Litz wire | No | 3.7 | 71 | — | 66 | [13] |
| 10 | 20 | H-bridge | Litz wire | Yes | 2,000 | 85 | — | — | [6] |
| 10 | — | — | — | Yes | 3,300 | — | — | 90 | [14] |
| 15 | 6,700 | HF transceiver | Loop + pancake coil | No | — | 93 | — | — | [15] |
| 15 | — | H-bridge | Litz wire | Yes | 2,000 | 95 | — | — | [16] |
| 18 | 145 | — | Litz wire | Yes | 300-3,000 | — | — | 90 | [17]-[19] |
| 20 | 4,000 | Class-E | Copper wire coil | No | 2 | — | 50 | — | [20] |

-continued

| D [cm] | fo [kHz] | Driver Technology | Coil Technology | Magnetic Material | $P_{load}$ [W] | $\eta_{transfer}$ [%] | $\eta_{dc\text{-}load}$ [%] | $\eta_{cc}$ [%] | Ref. |
|---|---|---|---|---|---|---|---|---|---|
| 20 | 20 | H-bridge | Power lines | Yes | 60,000 | 80 | — | — | [21] |
| 20 | 20 | H-bridge | Power rail | Yes | 27,000 | — | — | 74 | [22] |
| 30 | 3,700 | HF transceiver | Surface spiral | No | 220 | 95 | — | — | [10] |
| 30 | 6,000 | Class-E | Copper pipe coils | No | 95 | — | 77 | — | [our work] |
| 18-30, 40** | 20 | H-bridge | — | Yes | 3,000 | — | — | >85 | [23], [24] |
| 70 | 7,650 | Signal generator | Loop + pancake coil | No | 30 | 75 | — | — | [25] |
| 50 | 13,560 | Class-E | Loop + rectangle coil | No | 70 | 85 | 70*** | — | [11] |
| 50 | 27,000 | HF transceiver | Loop + spiral coil | No | 40 | 47 | — | — | [8] |
| 100 | 508.5 | Class-D | Litz wire | No | 5-35 | 76 | — | — | [26] |
| 200 | 9,900 | Colpitts oscillator | Litz wire | No | 60 | 50 | — | 15 | [9] |

*Maximum power transfer distance stated in the cited website [24]
**Calculated based on estimated value of $\eta_{driver}$ [11]

In the following there is provided an overview of IPT theory, outlining systems architecture and key component selection that define the system's end-to-end and dc-to-load efficiencies. Cost efficient coil design, simulations and measurements to achieve dc-to-load efficiencies above 70% for sub-meter distances are described. A framework for driver modelling, component selection and layout considerations to achieve a low loss, high frequency DC-RF conversion, capable of delivering more than 100 W at a distance of 30 cm is described. A full system characterization under different misalignment scenarios is also described.

With the typical IPT system architecture shown in FIG. 1, the driver provides high frequency power to the TX coil, having an unloaded quality factor QTX, which couples as defined by the coupling factor (or coefficient) k to the RX coil, having an unloaded quality factor QRX. It is known that by using receiver (or secondary) resonance and optimising the load impedance, the link efficiency can be maximized to give:

$$\eta_{link} = \frac{k^2 Q_{Tx} Q_{Rx}}{\left(1 + \sqrt{1 + k^2 Q_{Tx} Q_{Rx}}\right)^2} \quad (1)$$

As can be seen from the above formula, the key to achieving high efficiency is to maximise k2QTXQRX. The coil Q factor can be maximized by choosing the correct operating frequency [27]. Analysis on the interactions of these key variables, using both closed form mathematical expressions and more detailed numerical modelling in Matlab, has yielded the following underlying principles for optimisation [28]

The loop radii should be maximized, in order to maximize the coupling factor;
For a given constraint on loop dimensions, there is an optimal frequency, which is approximately the point at which the radiation resistance begins to be significant compared to the skin-effect resistance;
The wire radius and the number of coil turns should be as large as possible (bearing in mind that the coils should remain electrically small, to limit the electric field and hence radiation; and
In the case where the loops are not of equal size, the maximum operating0frequency will be mainly determined by the larger of the two coils, also this dictates the lowest self-resonance frequency.

As presented in [12], four different configurations have been widely used for IPT systems. A series resonance can only be used if the parasitic shunt capacitance of the inductor is assumed to be negligible. In contrast, this assumption is not needed for the parallel case, since the parallel resonator capacitor can absorb the parasitic capacitance of the coil.

Furthermore, the coupled RX coil is always assumed to be operating at resonance; this way the equivalent optimal load on the transmitter, reflected from the receiver, will only be resistive, affecting only the damping of the transmitter tank [2].

To increase the efficiency of an IPT system, capable of transmitting tens to hundreds of watts at a distance of 30 cm, with perfectly aligned coils, simulations as described in [28] and measurements as described in [29], were undertaken for the TX and RX coils. With this technique, the Q-factor was measured through transmission coefficient measurements using two loosely inductive coupled coils as probes. For electromagnetic design reasons, the distance D from the centre-to-centre of the coils is used. However, it is important to note that the minimum distance between coils is (D-7) cm in these results. As mentioned previously, a different sized TX and RX coil was used in the setup; this was thought to be more realistic for most scenarios. The coils were fabricated with copper piping having a 1 cm diameter and 1 mm wall thickness.

After characterizing the coils, the highest Q for both TX and RX coils is found close to 6 MHz, where skin depth is only 27 μm. The maximum unloaded Q value for the 5-turn, 20 cm diameter RX coil was QRX=1,100 and QTX=1,270 for the 3-turn, 30 cm TX coil; these matched simulation results when using the following standard expression for the unloaded Q-factor of a coil:

$$Q = \frac{\omega_d L}{R_{rad}(\omega_d) + R_{skin}(\omega_d)} \quad (2)$$

$$R_{rad}(\omega_d) = N^2 \eta_0 \left(\frac{\pi}{6}\right)(\beta_0(\omega_d) r)^4$$

$$R_{skin}(\omega_d) \approx \frac{Nr}{2a}\sqrt{\frac{\omega_d \mu_0}{2\sigma_0}}$$

where $\omega_d$ is the driven angular frequency of operation, L is the self-inductance of the coil, $R_{rad}(\omega_d)$ is the radiation resistance [30], N is the number of turns of the coil, $\eta_0$ is the impedance of free space, r is the radius of the coil, $\beta_0(\omega_d)=2\pi/\lambda_d$, $\lambda_d$ is the free space wavelength at the driving clock frequency, a is a radius of the copper pipe, $\sigma_0$ is the low frequency conductivity of copper and $\mu_0$ is the permeability of free space. $R_{skin}(\omega_d)$ is an approximation of the skin-effect resistance but was calculated in simulations using Butterworth's numerical model [31], which also takes into account proximity effects.

A re-configurable test fixture was fabricated to hold the coils and allow for reproducible and easily adjustable operating scenarios, as will be described below. Perspex was used for both the stands and the coil spacers, to avoid the generation of eddy currents that could result in measurement errors. The coil spacers helped to maintain a fixed distance of 2 cm between windings, measured from the centres of the pipe, to reduce the proximity effect between turns. The test fixture allows the variation of D, transverse offset and angular misalignment between both coils.

Figure 2:
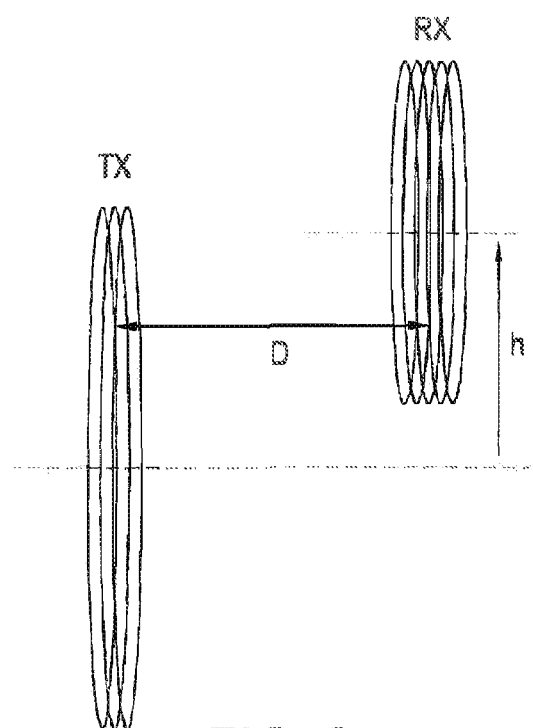
FIG. 2 shows an experimental set-up for distance and transverse offset measurements.
Figure 3:
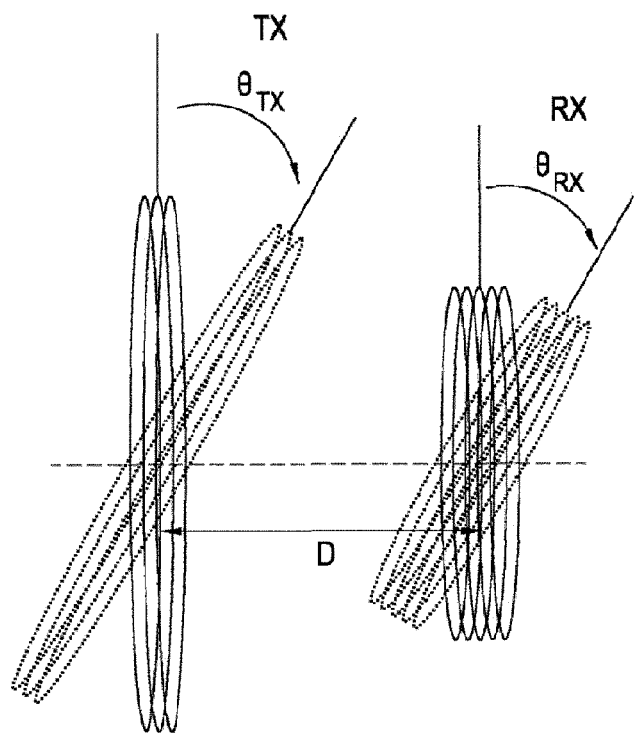
FIG. 3 shows an experimental set-up for angular misalignment measurements.

Coupling factor measurements were undertaken to characterize the coil coupling in an array of different scenarios. Measurements were undertaken with different separation distances or against transverse coil offsets h, as illustrated in FIG. 2; or transmitter or receiver coil angular misalignment, θTX or θRX, respectively, as illustrated in FIG. 3. For experiments involving transverse offset or angular misalignment, the centre-to-centre distance was fixed at D=30 cm, (the minimum distance between coils is 23 cm). Data from these measurements was also used to predict the operating characteristics, as well as the expected efficiency of the IPT system. The k measurements and calculations were performed with a well-known voltage transfer technique, as described in detail in [2].

Figure 4:
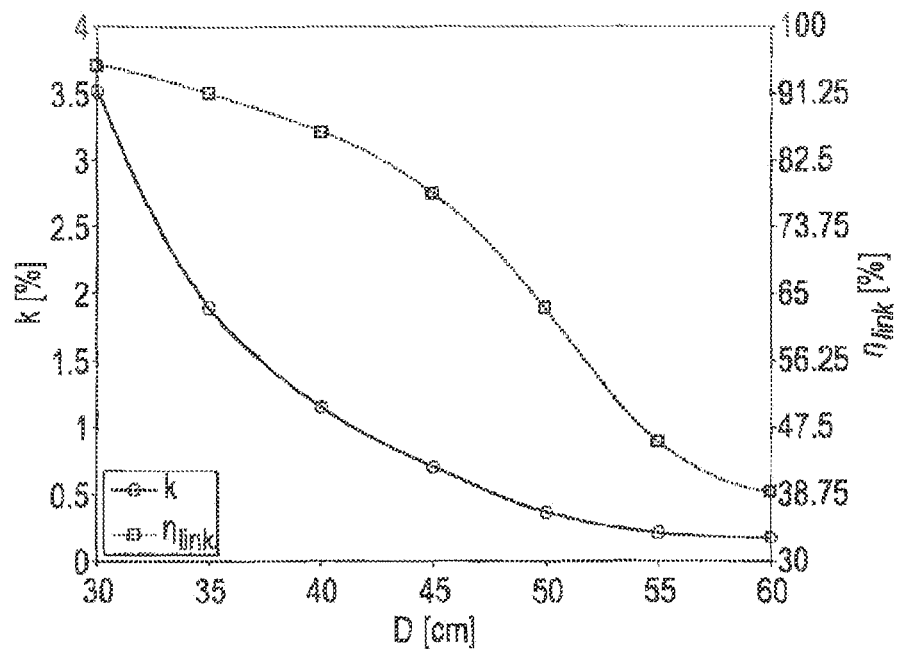
FIG. 4 illustrates measurements of coupling factor against coil separation distance in air, with perfectly aligned coils.
Figure 5:
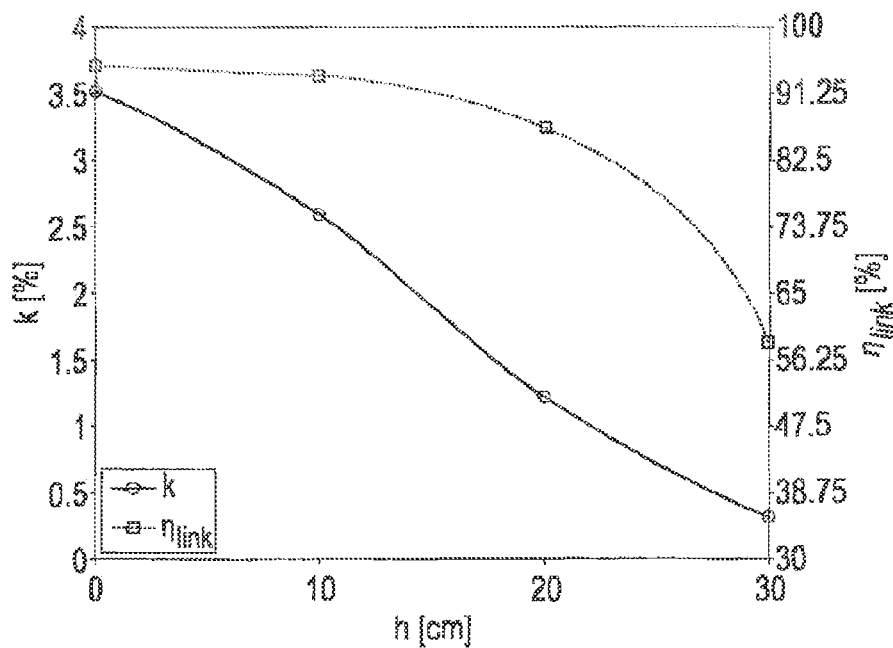
FIG. 5. illustrates measurements of coupling factor against coil transverse offset in air, at a distance of 30 cm.

FIGS. 4 and 5 show the coupling factor and link efficiency for different distance and transverse offset measurements.

Configurations which give rise to the same coupling coefficient are expected to achieve the same efficiency, i.e. perfectly aligned at a separation of D=40 cm should achieve the same efficiency as an offset of h=21 cm at D=30 cm.

Figure 6:
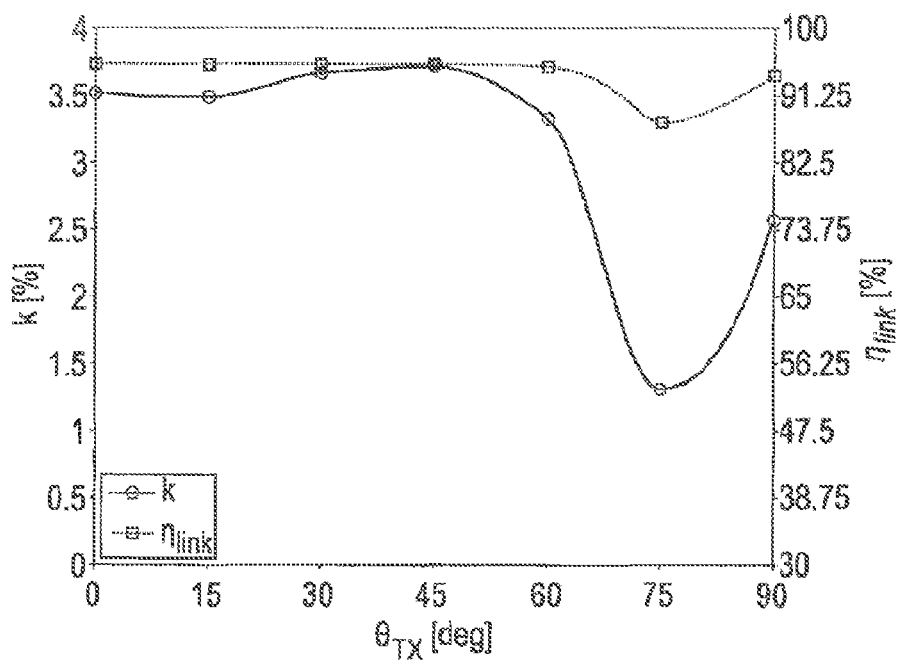
FIG. 6 illustrates measurements of coupling factor against transmitter coil angular misalignment, at a distance of 30 cm.
Figure 7:
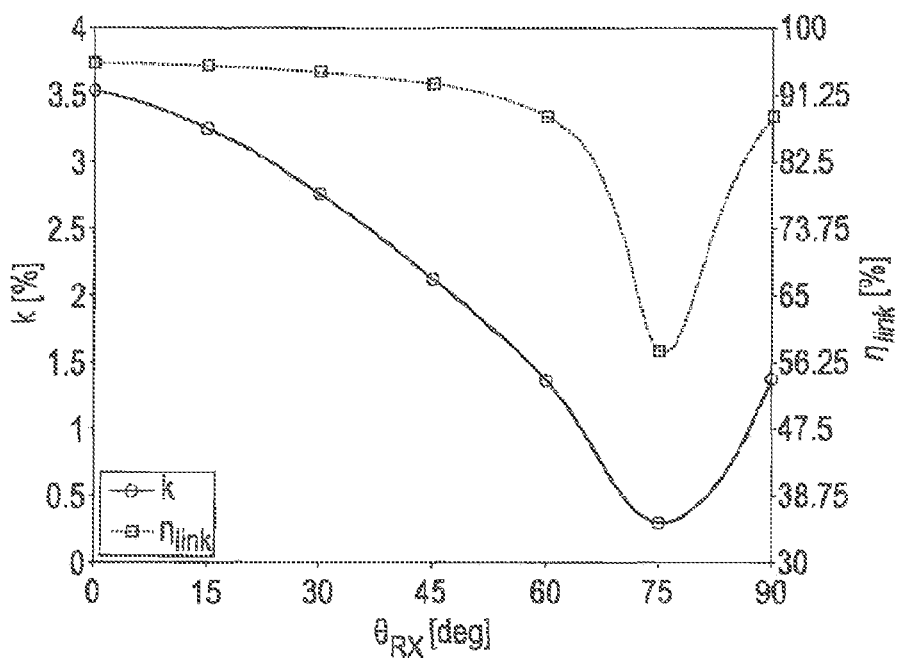
FIG. 7 illustrates measurements of coupling factor against receiver coil angular misalignment, at a distance of 30 cm.

FIGS. 6 and 7 show k measurement results for TX and RX angular misalignment, respectively. In FIG. 6, while the TX coil angle increases, the distance between both coils reduces enough to compensate for angular misalignment. With the RX coil angle variation, a trough is seen at θRX=75 degrees, since this is the point at which the distance between the coils is not enough to compensate for the angular misalignment. These conclusions are based on a clear correlation between the coupling factor measurements and dc-to-load efficiency.

Based on the above coupling factor analysis and measurements of the coils to be used in the later experiments, a high frequency, high power driver is required. In a typical IPT system, this is achieved by driving the coils with a 50Ω loop that is impedance matched to a high frequency COTS RF transmitter with an output power amplifier. In this typical RF scenario, the maximum power transfer is achieved but not the desired maximum efficiency. In accordance with the invention, the number of stages can be reduced if the 50Ω impedance is avoided, by integrating the power amplifier and impedance matching circuits into one driver sub-system. This is achieved by carefully designing a high efficiency power amplifier capable of high frequency operation. The Class-E amplifier is an ideal solution, since zero voltage and zero current switching can be achieved with the appropriate choice of components.

Class-E amplifiers have been designed and used extensively since Sokal and Sokal demonstrated the operational characteristics of their zero-switching power amplifier [32]. It is important to note, however, that even though this power amplifier topology is widely known, designing high power amplifiers capable of working at 100 W and switching at a few MHz is not a trivial task. This is mainly due to the high power rating and fast switching capabilities that only a suitable power RF MOSFET can achieve, as well as the need to employ high Q capacitors. Furthermore, since an atypical non-50Ω power amplifier is needed, to avoid additional impedance matching network components and their associated losses, the resonant Class-E topology needs to be modified to suit the coils' characteristics.

Figure 8:
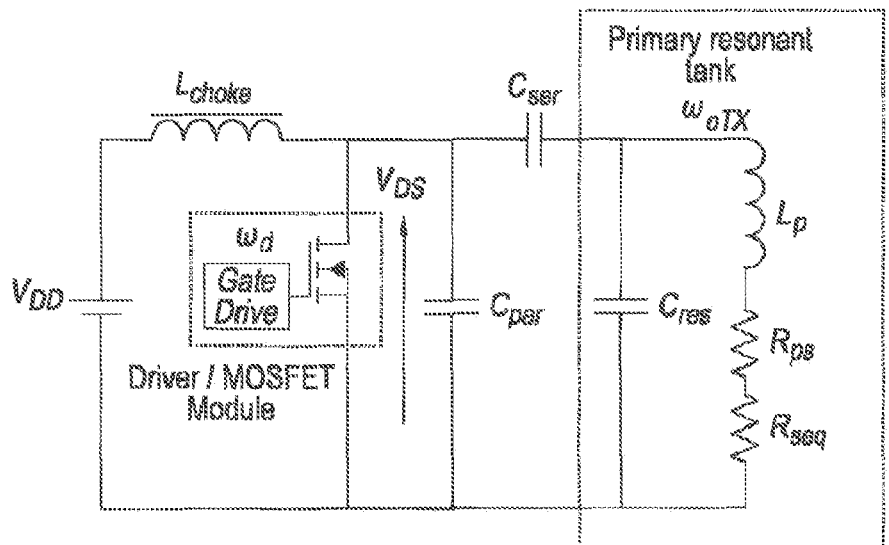
FIG. 8 shows a semi-resonant Class-E topology, with $\omega d<\omega oTX$ according to an embodiment of the invention.

To achieve a good efficiency, a semi-resonant Class-E topology was selected as a suitable solution [2]. FIG. 8 shows the circuit of a semi-resonant Class-E amplifier for the transmitter resonant tank, where the apparent load (represented by the TX coil series resistance Rps and the effective receiver impedance Rseq) and the apparent inductor (represented by the primary coil's inductance Lp), appear to be larger, thus helping to increase both driver and link efficiencies. This is achieved by tuning the primary resonant tank at a higher resonant frequency ωoTX taking into account the coil characterisations. This frequency is higher than the receiver's resonant tank driven resonant frequency ωo=ωoRX, at which the MOSFET gate driver switches at an operating frequency ωd, where ωoTX>ωoRX≡ωd. This semi-resonant operation also avoids the losses associated with an extra inductor, typically added in series with the TX coil to increase the driver efficiency [12], as the equivalent inductance of the semi-resonant tank, purposefully not tuned out, adds the required inductance determined by coil geometry, separation, alignment and relative angle and distance to RX, without needing an additional physical inductor. Furthermore, as will be demonstrated below, the use of semi-resonant operation allows a simple but effective tuning mechanism; by modifying the frequency ratio ωd/ωoTX, the effective equivalent resistance and inductance of the primary tank can change for different operating scenarios.

Thus, in accordance with an embodiment of the invention, the inductive power transfer system illustrated in FIG. 8 comprises an air core transmitter coil TX and an air core receiver coil RX spaced from the transmitter coil. The transmitter coil and/or the receiver coil has a diameter of at least 10 cm. In the illustrated embodiment the diameter of the transmitter coil is 30 cm and the diameter of the receiver coil is 20 cm. The spacing between the transmitter coil and the receiver coil, in use, is at least 15 cm. In the examples herein the spacing D between the transmitter coil and the receiver coil ranges between 30 cm and 60 cm.

The system further comprises a transmitter circuit comprising the transmitter coil and a receiver circuit comprising the receiver coil. The transmitter circuit is in the form of a Class E amplifier comprising a first inductor Lchoke and a transistor (MOSFET) in series between the terminals of a power supply VDD. The transistor is arranged to switch at a first frequency ωd by means of a gate drive. A first capacitor Cpar is arranged in parallel with the transistor between the first inductor Lchoke and a power supply terminal. A primary resonant tank circuit is provided in parallel with the first capacitor Cpar. The tank circuit comprises the transmitter coil and a second capacitor Cres arranged in parallel with the transmitter coil. A third capacitor Cser is provided in series with the first inductor Lchoke between the first capacitor Cpar and the tank circuit. In FIG. 8, the inductance of the transmitter coil TX is represented by the inductor Lp and the resistance of the transmitter coil is represented by the resistor Rps. The resistor Rseq in FIG. 8 represents the resistive effect of the receiver coil RX on the primary resonant tank circuit. The receiver circuit comprises a Class E rectifier.

The capacitance of the second capacitor Cres is selected, such that the resonant frequency ωoTX of the tank circuit is greater than the first frequency ωd. Typically, the ratio 35 of the first frequency ωd to the resonant frequency ωoTX of the tank circuit is within the range 0.7 to 1. The receiver circuit has a resonant frequency ω and the transmitter circuit is configured to vary the first frequency ωd, in order to achieve a desired impedance of the tank circuit. The first frequency ωd is at least 80 kHz, typically at least 1 MHz. The power transferred between the transmitter coil and the receiver coil is at least 10 milliwatts. In an alternative arrangement, the second capacitor Cres is arranged in series, rather than parallel, with the transmitter coil TX. In this case, the capacitance of the second capacitor Cres is selected, such that the resonant frequency ωoTX of the tank circuit is less than the first frequency ωd. Typically, the ratio of the first frequency ωd to the resonant frequency ωoTX of the tank circuit is within the range 1 to 1.5.

Using the results provided above, for an operating scenario with D=30 cm and a perfect coil alignment, PSpice simulations were performed to validate the design equations and design guidelines presented in [2], [33], [34] but modified to account for semi-resonant operation.

Figure 9:
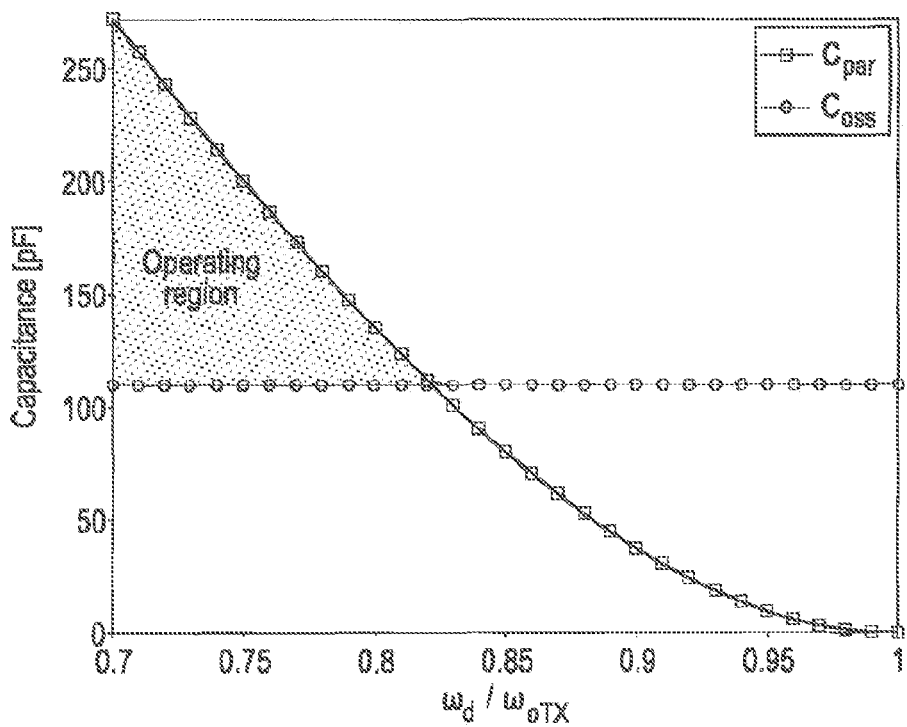
FIG. 9 shows simulated Cpar values against $\omega d/\omega woTX$ for Class-E MOSFET selection with a drain-source voltage of 230 V.

The IXYSRF IXZ421DF12N100 module, which includes a DE375-102N12A power MOSFET and integrated gate driver, was selected as the best available MOSFET because of its high power handling and nanosecond switching capabilities. This module was also selected due to its relatively low output capacitance Coss at drain-source voltage VDS=230V, required for 100 W operation. It is important to note that Coss is effectively absorbed by Cpar and thus is a limiting factor for selecting the maximum ωd/ωoTX required for high efficiencies. FIG. 9 shows this dependency, where a maximum ωd/ωoTX=0.82, for the set of coils described in the previous section, can be achieved using the selected MOSFET.

Working past this threshold would result in a detuned Class-E amplifier, incapable of achieving zero-voltage, zero-current at the time of switching. At this optimal point, for the same power, VDS will increase and IDS will decrease, resulting in a greater Class-E efficiency.

During simulations, parasitic inductances and capacitances were added to the model as well as the effective series resistance (ESR) of the capacitors to account, as accurately as possible, for all the losses during operation. Variations of less than 5% in the Class-E capacitor values, compared to those used in the PSpice simulation, were required to achieve a zero voltage, zero current crossing and account for the high loaded Q of the resonant circuit due to a low coupling factor.

Figure 10:
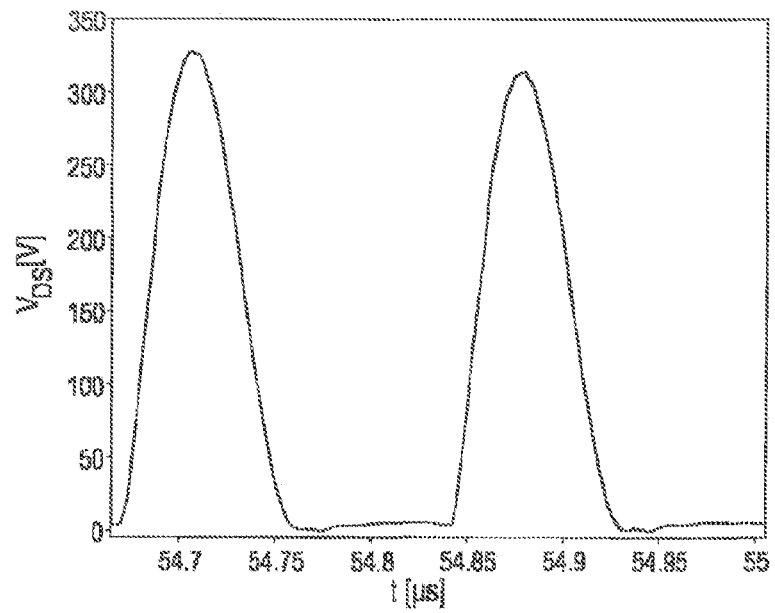
FIG. 10 shows the simulated drain-source voltage (PSpice) against time t for the semi-resonant Class-E driver.

As shown in FIG. 10, a smooth landing of VDS was possible without any negative ringing and an almost ideal Class-E operation was achieved with a simulated dcto-load efficiency of 80%.

Several key layout considerations had to be taken into account, in order to avoid ground bouncing and ensure good operation. The integrated driver/MOSFET module's input dc bus and gate signal were kept as short as possible; this also applied to ground paths for the module, PSU and load. To achieve this, ground planes were placed around all components in both layers of the standard low-cost FR-4 substrate, leaving arcing clearances around the tracks and components that were located close to the coil, where voltages as high as 1 kV are present during operation. Similarly, as with the tracks between the driver and MOSFET, all grounding tracks were kept as short as possible to decrease their resistance and inductance, but wide enough to avoid track lifting due to overheating.

In addition to layout considerations, component selection was crucial to enable high frequency operation. A combination of Dielectric Laboratories C40AH capacitor values were employed for Cpar, Cser and both resonator capacitors as they have very high Q and low ESR. Finally, the choice of the choke inductor that ensures only dc current from the PSU flows through the MOSFET was particularly challenging to design, due to the high current and high frequency characteristics of the system. A ferrite core was not suitable, due to its poor high frequency performance. For this reason, an iron powder core was selected, due to its low permeability and stability for high power applications, as well as high self-resonance frequency.

Figure 11:
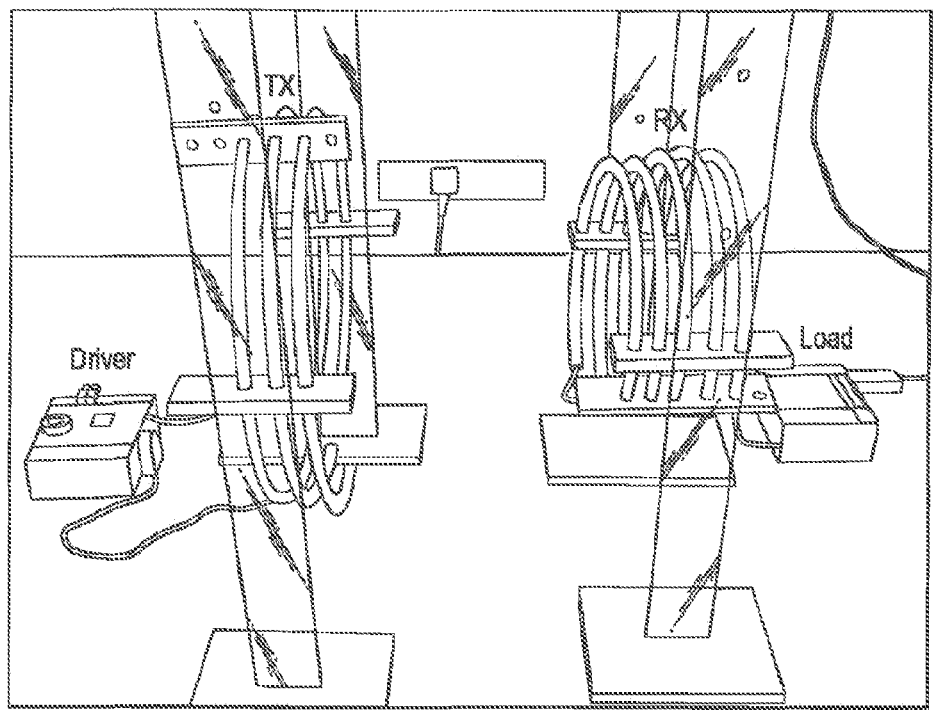
FIG. 11 shows a perfectly aligned IPT test rig with D=30 cm.

To fully characterize the practical IPT demonstrator system, shown in FIG. 11, a thorough experimental analysis was performed. The main goal of these experiments was to investigate its behaviour in different scenarios, by varying distance, transverse offset and angular misalignment; this allows a comparison against perfect alignment, to which the system was initially tuned (based on simulations). Furthermore, the results from these experiments were compared against results from frequency tuning the system for each different scenario.

In all experiments, the input voltage VDD was kept constant at 60V. This allowed sensible values of drain-source voltage to be obtained during operation, to which the output capacitance of the MOSFET is dependent, and helped to avoid replacing Cpar in each experiment. A constant input DC power for all experiments could not be achieved. This is because, in several scenarios, driver operation was far away from Class-E operation, resulting in high losses during switching that could have degraded or destroyed the MOSFET module.

Due to the fact that the optimal load is very large (e.g. 21 kΩ for the simulated scenario), a non-inductive resistor was used. Special considerations where taken to achieve the desired load with a resistive network, because a non-inductive resistor capable of handling more than 50 W was not commercially available. Metal film resistors where chosen, given their low inductance behaviour at high frequencies and capacity to handle a few watts (enough to withstand up to 100 W, once the load network was made). A major limitation for this type of resistor is that as its resistance and operating frequency increase the parasitic shunt capacitance also increases and as the resistor temperature increases its resistance varies. The parasitic capacitance for these resistors was calculated to be 2.8 pF at 6 MHz. This was taken into account when designing the load network and also the selection of the receiver's tuning capacitor. The total capacitance from the load resistor was absorbed by the calculated tuning capacitance, to ensure receiver resonance, thus avoiding the reflection of capacitive reactance to the transmitter side.

The dc-to-load efficiency of the system was initially measured using Agilent N2783A current probes, but, after several measurements, it was noted that the results were not reflecting the true operation of the circuit. Also, the current probes are not capable of measuring current accurately in the presence of significant electromagnetic noise [35]. The voltage across the load could not be measured with the oscilloscope probe, because the probe's capacitance is 15 pF, enough to detune the receiver coil from resonance. For these reasons, and the fact that the resistor's precise temperature dependence is unknown, an indirect method of measuring the dc-to-load efficiency was implemented. Power was inferred from accurate steady-state heat-sink temperature measurements, since both the driver and the load (including the tuning capacitors) were placed over separated, isolated heat sinks without forced-air cooling. The input DC power was also measured accurately and used together with the RX thermal measurements to calculate the dc-to-load efficiency using the following:

$$\eta_{dc\text{-}load} = \frac{T_{ssRX} - T_{amb}}{R_{thRX}(T)P_{dc}} \quad (3)$$

where Tamb is the ambient temperature, TssRX is the heat sink steady-state temperature of the receiving coils and RthRX(T) is the lumped thermal resistance of the RX load. The temperature measurements were calibrated by applying a known DC power to the RX load until all temperatures reached steady state. Measurements under the same thermal experimental conditions as when the IPT system was tested were performed.

Due to the RX load spatial distribution over the heat sink and the fact that the heat sink was positioned with the fins facing downwards on the bench, with a 333 K temperature gradient RthRX=208 KNV compared well to the manufacturers 203 KNV. Furthermore, by characterizing the load arrangement, the non-linear behaviour of the heat sink was accounted for, which can be as high as 25% to 50% of the dissipated heat, according to [36].

It is important to note that this is a conservative dc-to-load efficiency calculation, since Tamb will increase as TssRX increases; giving a lower qdc-load when compared to the scenario where Tamb could be kept constant until the steady state of the system is reached. Even more important is the fact that as the temperature of the resistors increases the value of the load resistance will start to drift away from its optimal value, drifting away from maximum efficiency.

To achieve a semi-resonant Class-E operation similar to that observed by simulations, an iterative tuning process was performed. This establishes the appropriate values for the driver and the coil capacitors (taking into account their fabrication tolerances) and the coil Q variations (due to metallic objects, such as bench supports, being in close physical proximity to the experiments).

First, the receiver resonator's capacitor had to be decreased, to account for the load resistor's equivalent shunt capacitance for correct receiver resonance. With an untuned receiver, the value of the transmitter resonator's capacitor would need to change, to account for the reflected reactance from the receiver onto the transmitter and ensure that semi-resonance operation is still present. This changes the ratio of ωd/ωoTX, which creates the need for retuning Cpar and Cser. The major limitation of this scenario is that if the ratio ωd/ωoTX starts to increase, there is a point at which the required Cpar needed to tune the driver is lower than Coss of the MOSFET, which makes the MOSFET unsuitable for Class-E operation.

Once receiver resonance is obtained, a similar procedure can be followed to achieve zero switching operation, as described in [33]. Since Cpar is implemented by an external physical capacitor and Coss, which is dependent on VDS, extra iterations are needed to achieve good operation. As seen from simulations, VDS is a very useful guide to Class-E operation, therefore tuning the peak-to-peak voltage is as important as achieving zero voltage zero current switching to increase the efficiency [34]. Based on [32], if VDS>3.56 VDD, Cpar needs to be increased in steps of 5 pF and if VDS <3.56 VDD, it should be decreased by the same amount until the correct VDS is achieved. While doing this, Cser may need a slight adjustment to bring back the driver to zero switching.

Figure 12:
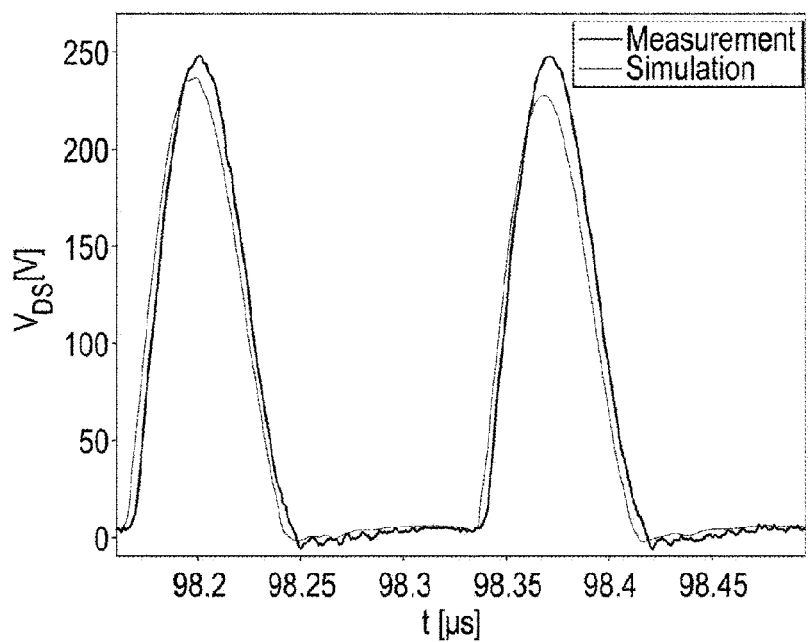
FIG. 12 shows the drain to source voltage against time for the IPT system with a 30 cm separation distance and Pdc=90 W.

Since the load resistance value varies with temperature, several iterations were performed by increasing or decreasing the load resistance by ±5%, until a maximum efficiency of 66% was achieved. For each iteration, receiver resonance was achieved and tuning of Cpar and Cser was performed as previously described. FIG. 12 shows the drain source voltage (simulated and measured) for the tuned IPT system for an aligned set of coils at a separation distance of 30 cm; the input dc power was 90 W.

Whilst the waveform generated from simulations has a smooth landing, a negative ripple of less than 10V can be seen when the MOSFET is ON. This negative ripple is generated by a small voltage still present at the drain, when the MOSFET is turned ON, due to a higher than expected loaded Q for the transmitter resonant circuit. This was the best possible switching achieved with the discrete capacitors available. The higher measured VDS results could be decreased by adding more capacitance to Cpar, but this change was not reflected in a measurable efficiency improvement. Therefore, to decrease the losses in the capacitor (due to ESR), no extra parallel capacitor was added and VDS was left higher than expected in the simulation.

Figure 13:
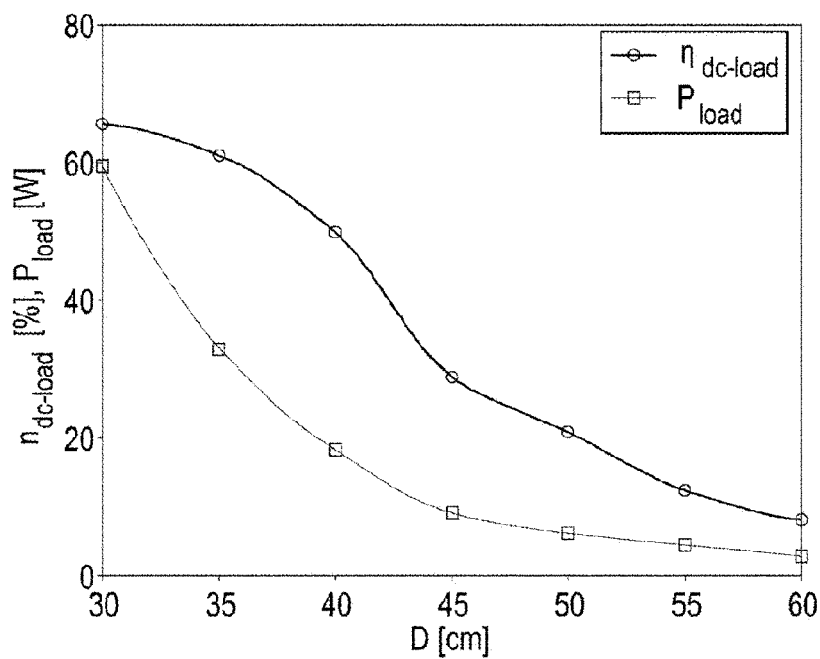
FIG. 13 illustrates measurement of the dc-to-load efficiency against separation distance with fixed clock frequency tuning to aligned 30 cm separation distance scenario.

Once the IPT system was optimally tuned to achieve a high efficiency, while being perfectly aligned, measurements with different separation distances were performed to observe the operating capabilities without performing extra tuning. As can be seen in FIG. 13, the distance between the coils was varied between 30 and 60 cm. As D increases the efficiency decreases as the coupling factor decreases, detuning the driver and creating the need for different Cpar and Cser values to re-establish zero switching operation.

Figure 14:
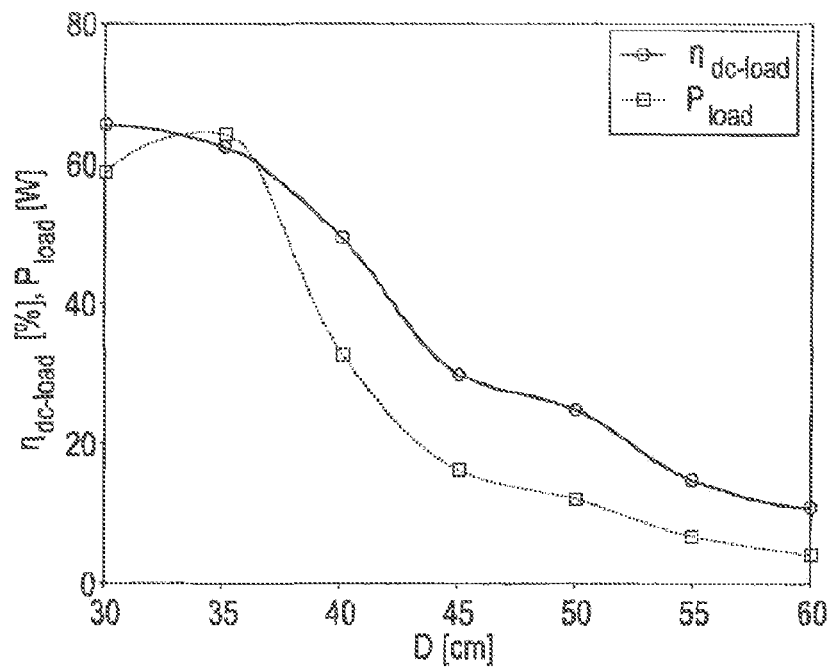
FIG. 14 illustrates measurement of the dc-to-load efficiency against separation distance with clock frequency tuning.

An easier tuning alternative is to change the operating frequency of the clock, thus relying on the semi-resonant operation of the driver. When this was performed, the receiver was no longer in resonance and the transmitter sees a reflected reactance. This extra reactance, in addition to the transmitter's reactance, was enough to improve the tuning of the semi-resonant Class-E driver, modifying ωd/ωoTX and shifting the driver's waveforms closer to zero-switching operation. As seen in FIG. 14, as the clock frequency was altered for each different measurement, the efficiency increased considerably over untuned operation. The dc-to-load efficiency from the clock-frequency tuned version at a 50 cm separation distance was 25%, compared to 20%, as seen in FIG. 13. It is important to note that to achieve this increase in efficiency, a clock frequency change of less than 1% was required.

Figure 15:
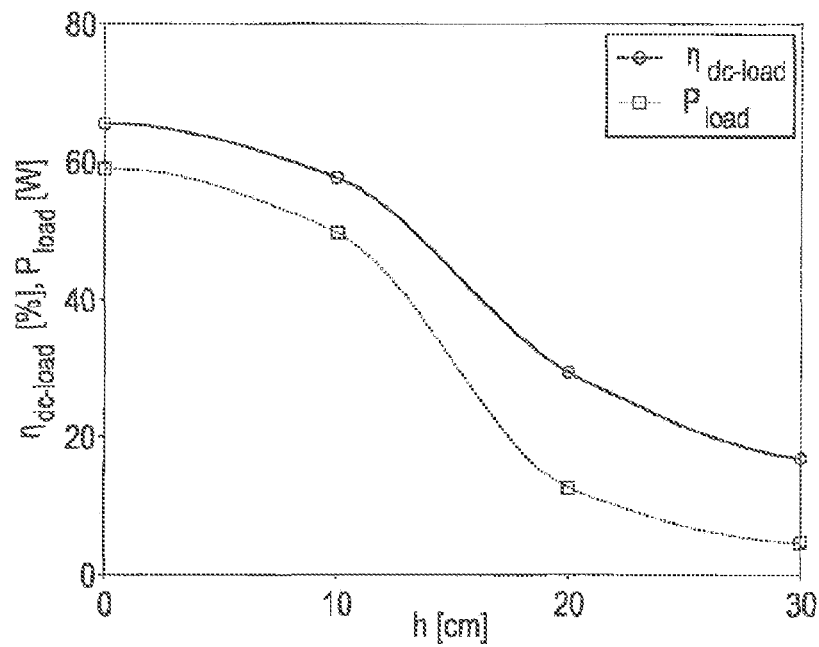
FIG. 15 illustrates measurement of the dc-to-load efficiency against coil transverse offset with fixed clock frequency tuning to aligned 30 cm separation distance scenario.

To analyse the efficiency of the IPT system, for a set of scenarios with different offsets, as shown in FIG. 2, measurements for both the perfectly aligned 30 cm impedance tuning with fixed clock frequency case and with clock frequency tuning were performed. FIG. 15 shows the results for IPT with different coil offsets. In this case, dc-to-load efficiency decreases; following a similar trend as the corresponding measurements above. It can be seen that even with an offset of 10 cm, and no additional tuning, the IPT system performed with a dc-to-load efficiency above 58%.

Figure 16:
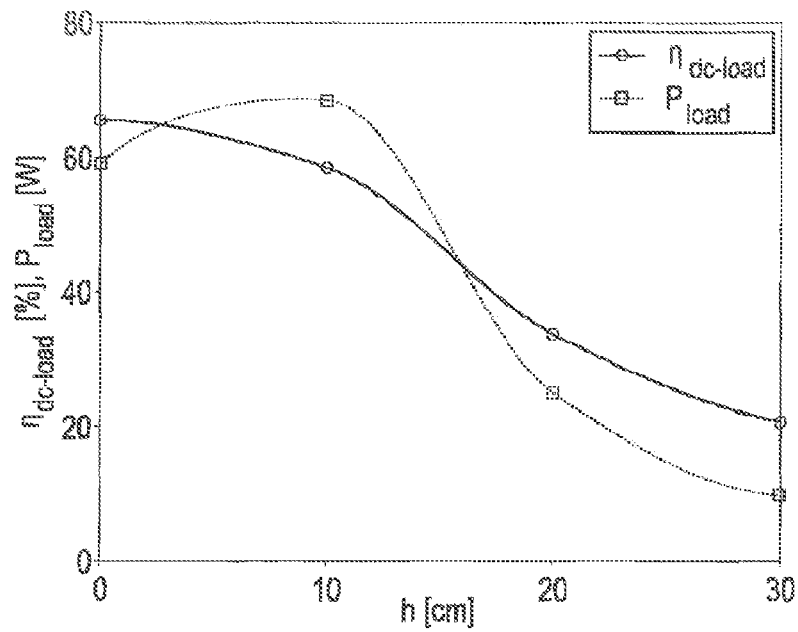
FIG. 16 illustrates measurement of the dc-to-load efficiency against coil transverse offset with only clock frequency tuning.

With clock frequency tuning, as shown in FIG. 16, the dc-to-load efficiency was above 50%, with h<14 cm, and an efficiency increase of 5% was achieved with an offset of 20 cm.

Although higher dc-to-load efficiencies could be achieved with tuning the optimal load for each offset, the results presented in this figure demonstrate that efficiencies above 50% can be achieved even at highly misaligned scenarios without the need for load tuning or complex and heavy coupling factor enhancement techniques.

Figure 17:
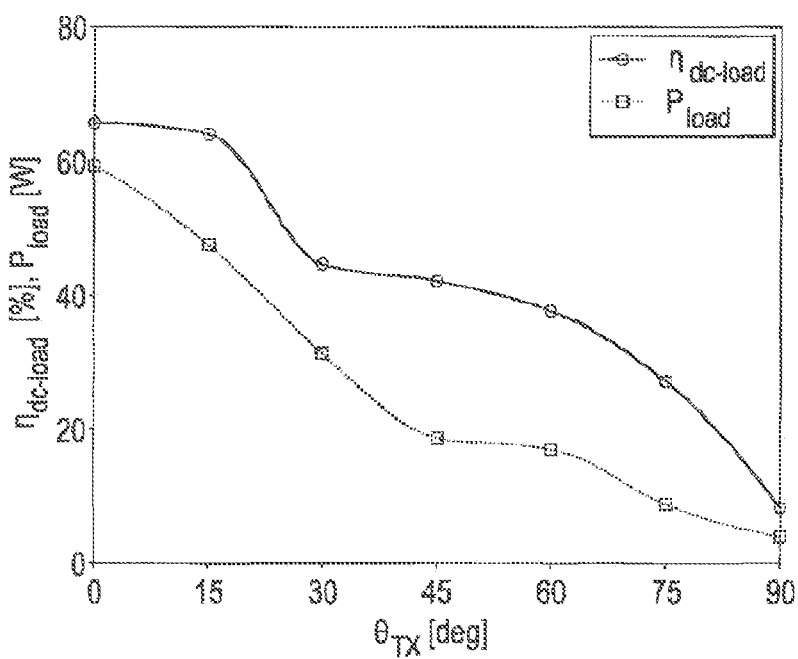
FIG. 17 illustrates measurement of the dc-to-load efficiency against TX coil angle with fixed clock frequency tuning to aligned 30 cm separation distance scenario.
Figure 18:
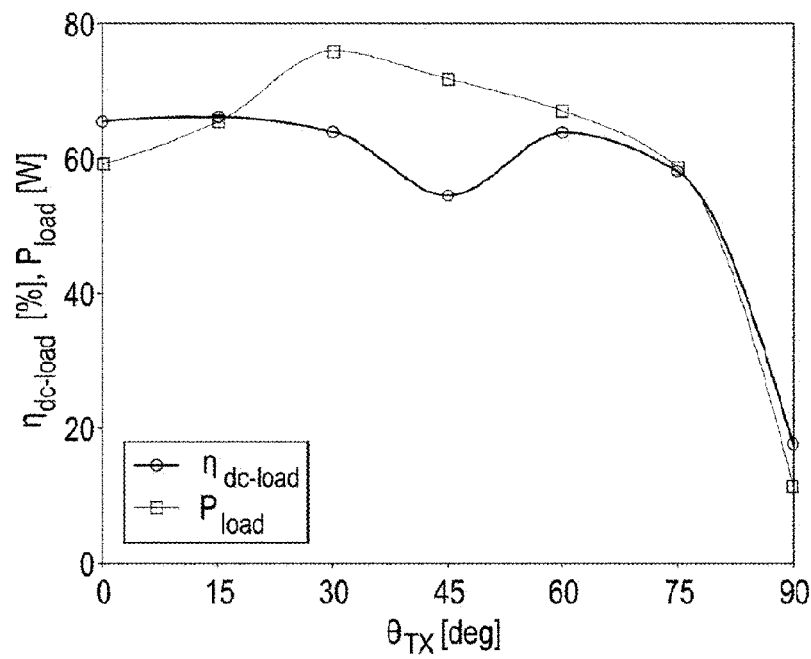
FIG. 18 illustrates measurement of the dc-to-load efficiency against TX coil angular misalignment with clock frequency tuning.

To characterise how the system operates while varying coil misalignment angle θ, in both transmitter and receiver, measurements at a fixed distance of D=30 cm were performed, as shown in FIG. 3. From FIGS. 17 and 18, measurements for a varying TX coil angle θTX were performed. As predicted, by the coupling factor measurements, a constant high efficiency was achieved for angles below 75 degrees when clock frequency tuning was performed. In contrast, a decrease in efficiency, not clearly linked with k was seen with the fixed clock frequency scenario. This is due to the fact that with the fixed clock frequency tuning case the presence of a larger reflecting load from the receiver influenced efficiency more than with the relatively large and constant coupling factor in the tuning of the IPT system. With the clock frequency tuning scenario, the frequency variation was enough to tune the Class-E and exploit the benefit of almost constant k. DC-to-load efficiencies above 60% were achieved for almost all θTX<72 degrees with clock frequency tuning, showing the capabilities of the system to perform in a wide range of transmission angles with a fractional frequency variation of less than 6%.

Figure 19:
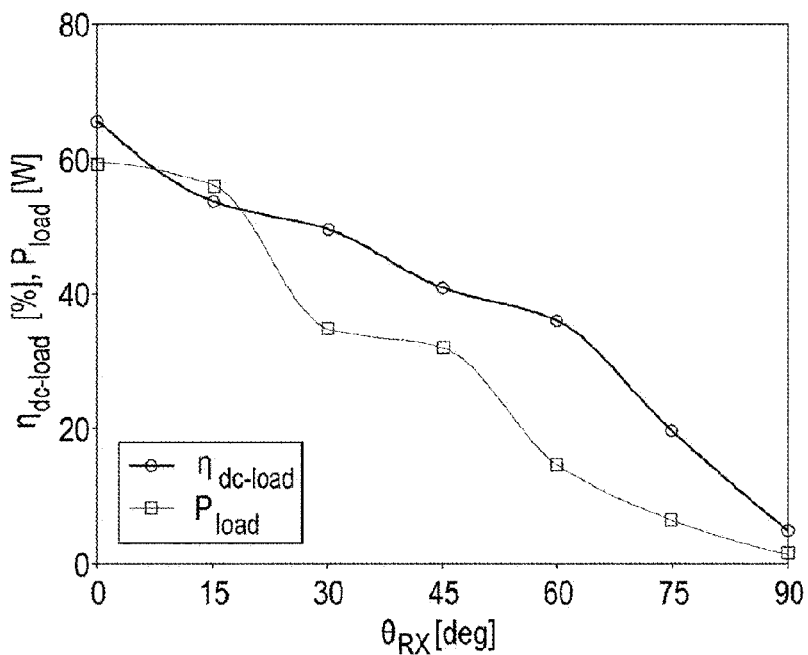
FIG. 19 illustrates measurement of the dc-to-load efficiency against RX coil angular misalignment with fixed clock frequency impedance tuning to aligned 30 cm separation distance scenario.
Figure 20:
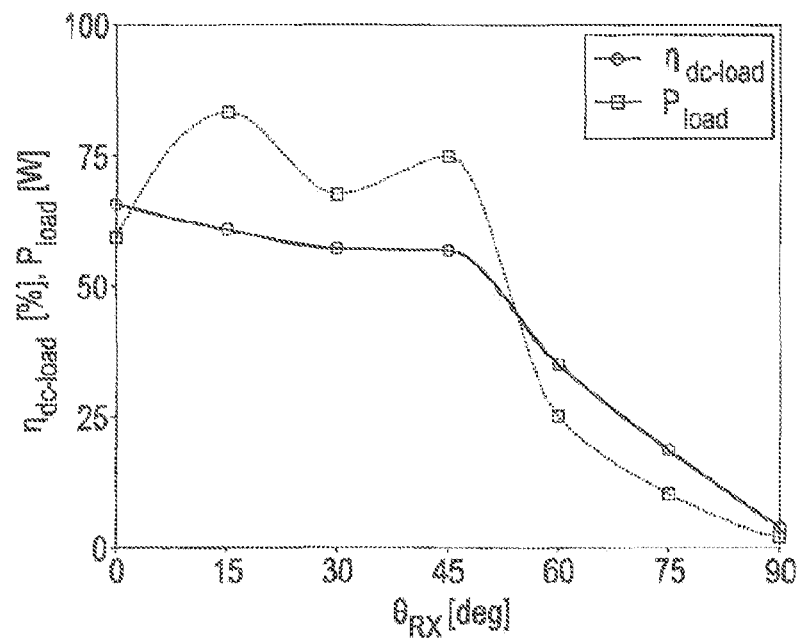
FIG. 20 illustrates measurement of the dc-to-load efficiency against RX coil angular misalignment with clock frequency tuning.

Finally, measurements with a varying θRX were performed, as shown in FIG. 19. The efficiency was almost constant and above 50% up to θRX=52 degrees. Above this angle, the efficiency decreased dramatically, as predicted by the coupling factor measurements. A noticeable difference could be appreciated in FIG. 20, with θRX=45 degrees, where the dc-to-load efficiency was 56% in the clock frequency tuned case and only 40% in the fixed clock frequency impedance tuned version.

Finally, the efficiency of the system was increased until the power dissipated by the load resistors caused them to overheat and fail. The highest dc-to-load efficiency achieved with the current prototype design was ηdc-load=77% for an aligned set of coils at a distance of 30 cm with Pload=105 W.

The calculated link efficiency based on the unloaded Q and k measurements was 95%. The dc-to-load efficiency of the system was increased thanks to a higher VDD, which allowed Coss=Cpar. This avoided the use of an external capacitor and allowed for a higher ωd/ωoTX, which increased the apparent driver inductance of the system. This is believed to be the highest dc-to-load efficiency ever presented for an IPT system, without k enhancement techniques.

A comparison of state-of-the-art IPT systems has been given above, a clear efficiency analysis is suggested for a meaningful comparison between competing solutions and key differences between link and dc-to-load efficiencies have been highlighted.

An indirect thermal method for measuring Pload has been presented for the first time with an IPT system, to avoid measurement inaccuracies due to load resistance variations and high external electromagnetic fields in the current measurements.

This method was compared against the above coupling factor formula and well known coupling factor measurements and a clear correlation can be seen, demonstrating the robustness of the efficiency measurement procedure. Low cost, high Q coils and a complete design and operational analysis of a semi-resonant Class-E driver for this IPT system has been described. The driver topology and component selection enabled high frequency, medium power, wireless power transfer for different transmitter and receiver coil sizes. A detailed transverse offset and angular misalignment characterization demonstrated efficiencies above 50% for transverse offsets up to 14 cm and θRX=52 degrees.

Finally, dc-to-load efficiencies of 77% were demonstrated in a perfectly aligned scenario for D=30 cm, having a link efficiency of 95%.

Figure 21:
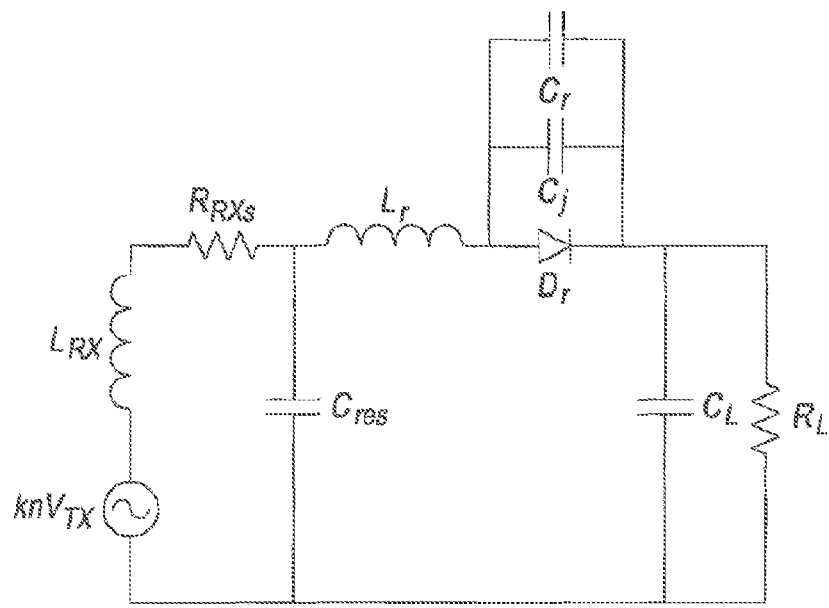
FIG. 21 is a schematic representation of Class E receiver circuit for use in an embodiment of the invention.

FIG. 21 is a schematic representation of a typical Class E receiver circuit according to an embodiment of the invention. The receiver circuit comprises the air core receiver coil RX of the inductive power transfer system described above. In FIG. 21, the inductance of the receiver coil RX is represented by the inductor LRX and the resistance of the receiver coil is represented by the resistor RRXs. The induced signal in the receiver coil is represented by the signal generator kqVTX The resistor RL in FIG. 21 represents the load powered by the receiver circuit.

The receiver circuit comprises a first capacitor CL arranged in parallel with the load RL. A secondary resonant tank circuit is provided in parallel with the first capacitor CL. The tank circuit comprises the receiver coil and a second capacitor Cres arranged in parallel with the receiver coil. In an alternative embodiment, the second capacitor Cres is arranged in series, rather than parallel, with the receiver coil A first inductor Lr is arranged in series with a first diode Dr between the tank circuit and the first capacitor CL. The junction capacitance of the first diode Dr is represented in FIG. 21 by the capacitor Cj in parallel with the first diode Dr. A third capacitor Cr is arranged in parallel with the first diode Dr.

In traditional operation, the capacitance of the second capacitor Cres is selected, such that the resonant frequency ωoRX of the secondary tank circuit is equal to the first frequency ωd, i.e., the gate drive frequency of the transmitter circuit.

Figure 22:
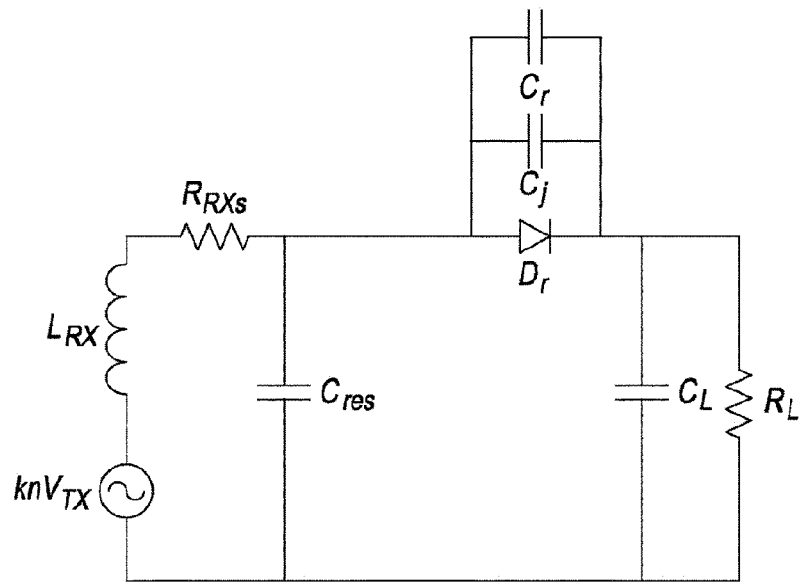
FIG. 22 is a schematic representation of Class E receiver circuit according to a further embodiment of the invention.

FIG. 22 is a schematic representation of Class E receiver circuit according to a further embodiment of the invention. This receiver circuit differs from the circuit of FIG. 21 in that the first inductor Lr is not present. In addition, the capacitance of the second capacitor Cres is selected, such that the resonant frequency ωoRX of the secondary tank circuit differs from the first frequency ωd, the gate drive frequency of the transmitter circuit. The secondary tank circuit therefore operates in semi-resonance and maintains some inductive impedance which performs the role of the first inductor Lr in the receiver circuit of FIG. 21. In this way, the necessary reactance for the Class E operation of the rectifier may be provided by the receiver coil alone. In this way, an inductor in addition to the receiver coil is not required. In the receiver circuit of FIG. 21, the first inductor Lr generates a significant amount of heat because of the large AC current it carries. This potential source of power loss is therefore avoided in the receiver circuit of FIG. 22.

Figure 23:
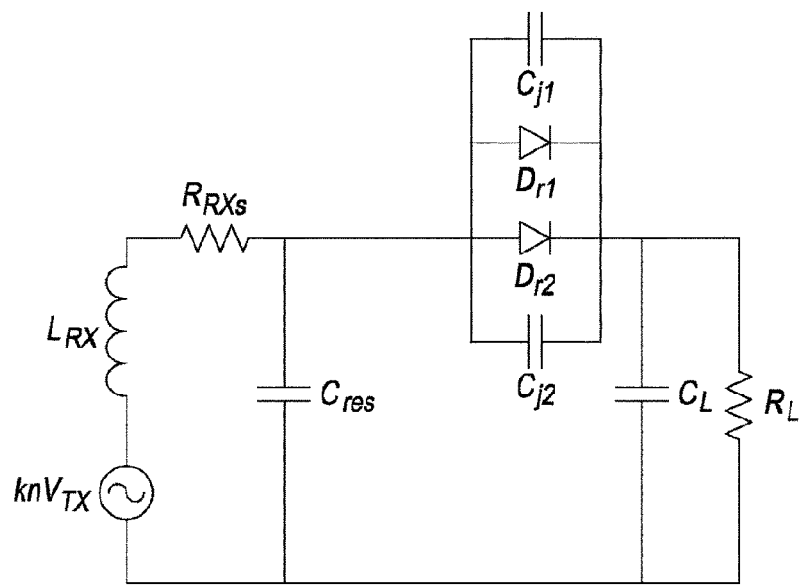
FIG. 23 is a schematic representation of Class E receiver circuit according to a yet further embodiment of the invention.

FIG. 23 is a schematic representation of Class E receiver circuit according to a yet further embodiment of the invention. This receiver circuit differs from the circuit of FIG. 22 in that the third capacitor Cr is not present. Instead, a second diode is provided in parallel with the first diode. The junction capacitances Cj1, Cj2 of the two diodes provide the equivalent capacitance to the third capacitor Cr and the junction capacitance Cj in the circuit of FIGS. 21 and 22. In this way, the operation of the receiver circuit is not constrained by the maximum voltage of the third capacitor Cr. Thus, the only capacitance in parallel with the diode(s) may be provided by the junction capacitance of the diode(s). The diode(s) may be silicon carbide diodes, gallium nitrate diodes or other wide band gap material. Silicon carbide (SiC) diodes provide the appropriate junction capacitance at the required operating voltages.

In the embodiment of FIGS. 22 and 23, the ratio ωd/ωoRX of the first frequency ωd to the resonant frequency ωoRX of the receiver tank is in the range 0.2 to 3. This range allows the tuning of the rectifier circuit for a desired output voltage and efficiency across different input voltages and receiver coil inductances. The inductance LRX of the receiver coil is typically in the range 0.5 to 8 μH. The capacitance of the first capacitor CL is typically in the range 0.02 to 100 μF. The capacitance of the second capacitor Cres is typically in the range 8 pF to 1.5 nF.

The transmitter circuit of FIG. 8 may be used in combination with the receiver circuits of any of FIGS. 21 to 23, but the circuit of FIG. 23 is presently preferred.

In summary, an inductive power transfer system comprises a transmitter coil TX and a receiver coil RX spaced from the transmitter coil. A transmitter circuit comprises the transmitter coil and is in the form of a Class E amplifier with a first inductor Lchoke and a transistor in series between the terminals of a power supply, a first transmitter capacitor Cpar in parallel with the transistor between the first inductor and a power supply terminal, a primary tank circuit in parallel with the first transmitter capacitor, the primary tank circuit comprising the transmitter coil and a second transmitter capacitor Cres arranged in parallel or series with the transmitter coil, and a third transmitter capacitor Cser in series with the first inductor between the first transmitter capacitor and the primary tank circuit. The transistor is arranged to switch at a first frequency ωd and the capacitance of the second transmitter capacitor is selected such that the resonant frequency ωoTX of the primary tank circuit is greater than the first frequency. The receiver circuit comprises a Class E rectifier having a first receiver capacitor CL arranged in parallel with a load RL and a secondary tank circuit in parallel with the first receiver capacitor. The secondary tank circuit comprises the receiver coil and a second receiver capacitor Cres arranged in parallel or series with the receiver coil. A first diode Dr2 is provided between the secondary tank circuit and the first receiver capacitor. The capacitance of the second receiver capacitor is selected such that the resonant frequency ωoRX of the secondary tank circuit differs from the first frequency, so that the secondary tank circuit operates in semi-resonance and maintains some reactive impedance. The transmitter circuit is configured to vary the first frequency, in order to achieve a desired impedance of the primary tank circuit.

In a further embodiment it is recognised that a long range inductive power transfer system can power remote sensors with μW level power consumption or above at distances considered long range such as up to 10 meters. This can be achieved, for example, between a large planar transmit coil and a small planar receiver coil demonstrating the viability of highly asymmetrical coil configurations that can be required in applications such as sensor networks. The arrangement can use high Q factor transmit and receive coils in conjunction with class-E amplifiers of the type described above in very low magnetic coupling scenarios and at the high frequencies of operation required for high Q operation.

As discussed in more detail above, when optimising the coils in an inductive power transfer system within a given dimensional constraint, an important parameter is Q factor. The fractional link efficiency η$_{link}$ is given by (1)d, where the coupling factor is given by:

$$k = \frac{M_{TxRx}}{\sqrt{L_{Tx}L_{Rx}}} \quad (4)$$

A coil's self-inductance L is proportional to its number of turns squared, the mutual inductance between the Tx and Rx coils MTxRx is proportional to the turns product of the two coils. Therefore k is effectively set by the coil's diameters and varies little with changes in the number of turns. As such, maximising Q factor by selection of appropriate operating frequency and minimising the coil's loss resistance are key to obtaining reasonable link efficiency.

The present approach achieves these parameters via various aspects of system and coil design. In an embodiment, ire coils are constructed by threading enameled wire through a former, composed of thin 100 (μm) flexible PCB material, with holes drilled at each wire corner; an electromagnetic shield such as a thin ferrite, TDK IRJ04 (μ=40, depth=0.5 mm) is then stuck to the reverse side of the coil to reduce the effect of metallic planes behind the coil. The ferrite has little measurable effect on the coils' Q factor.

Figure 24A:
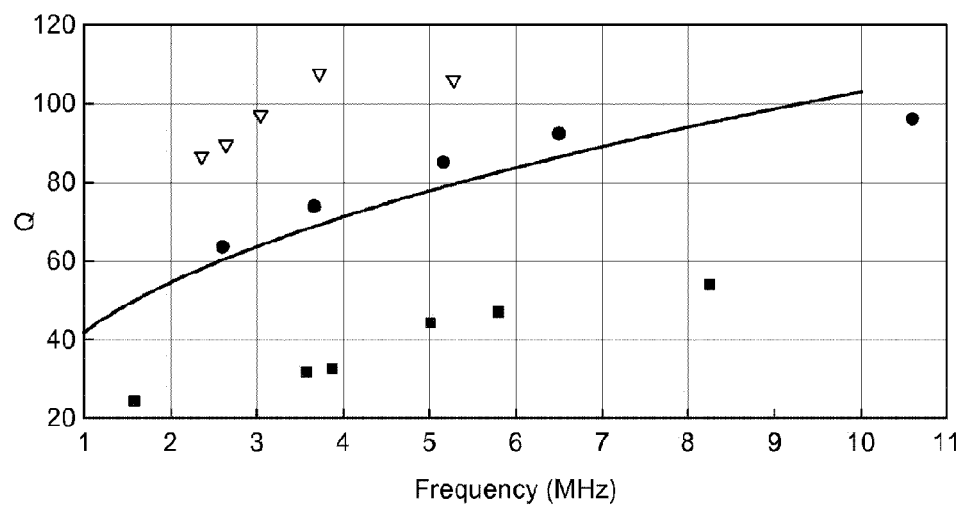
FIG. 24a shows results of Q vs. Frequency in MHz.
Figure 24B:
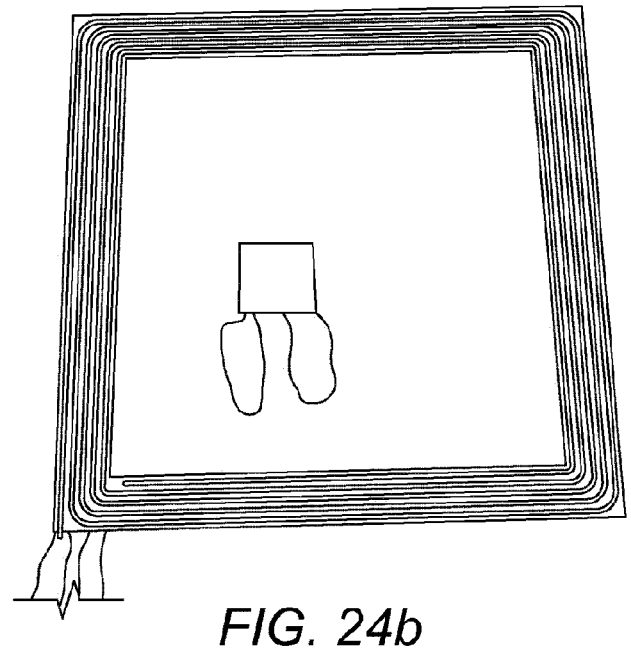
FIG. 24b shows comparatively a 170 mm$^2$ and a 20 mm$^2$ RX coil.
Figure 26A:
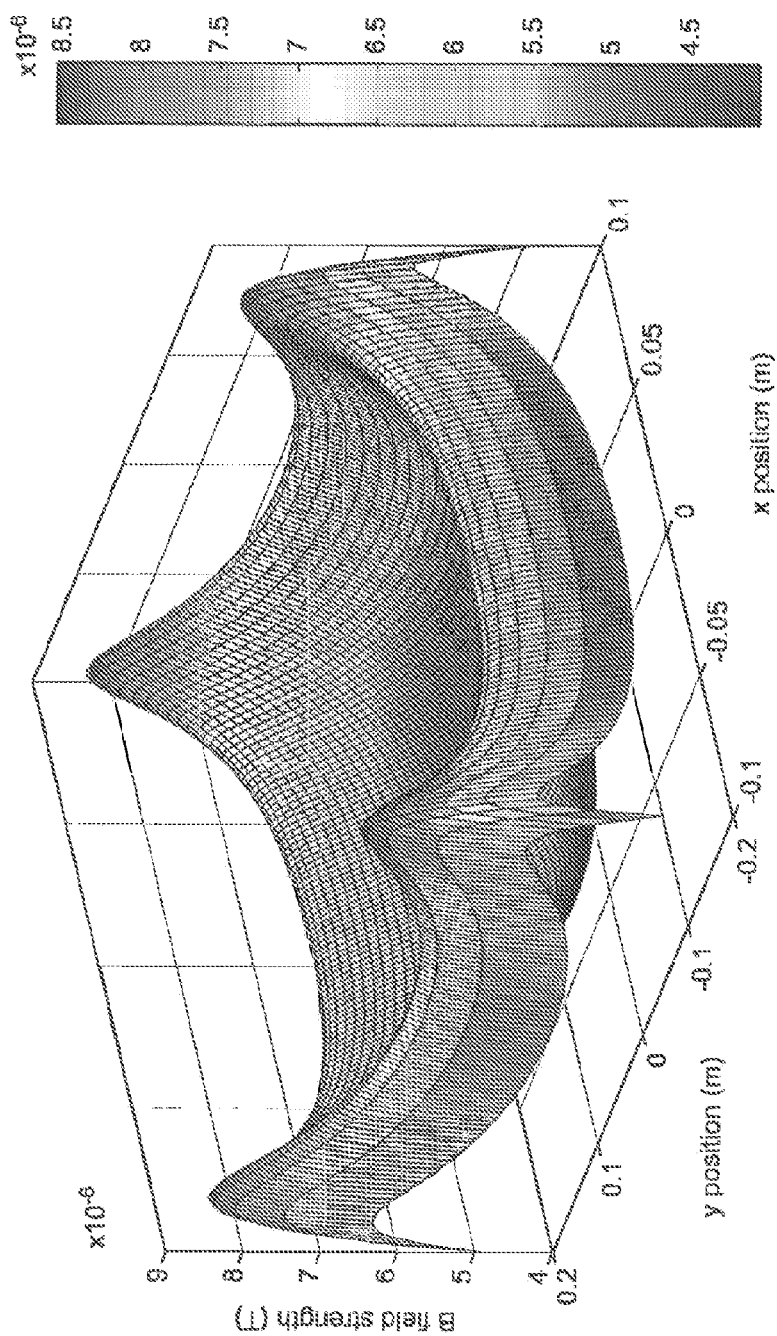
FIG. 26a shows magnetic field distribution for a displacement of 20 mm from coil centre (mouse cage)
Figure 26B:
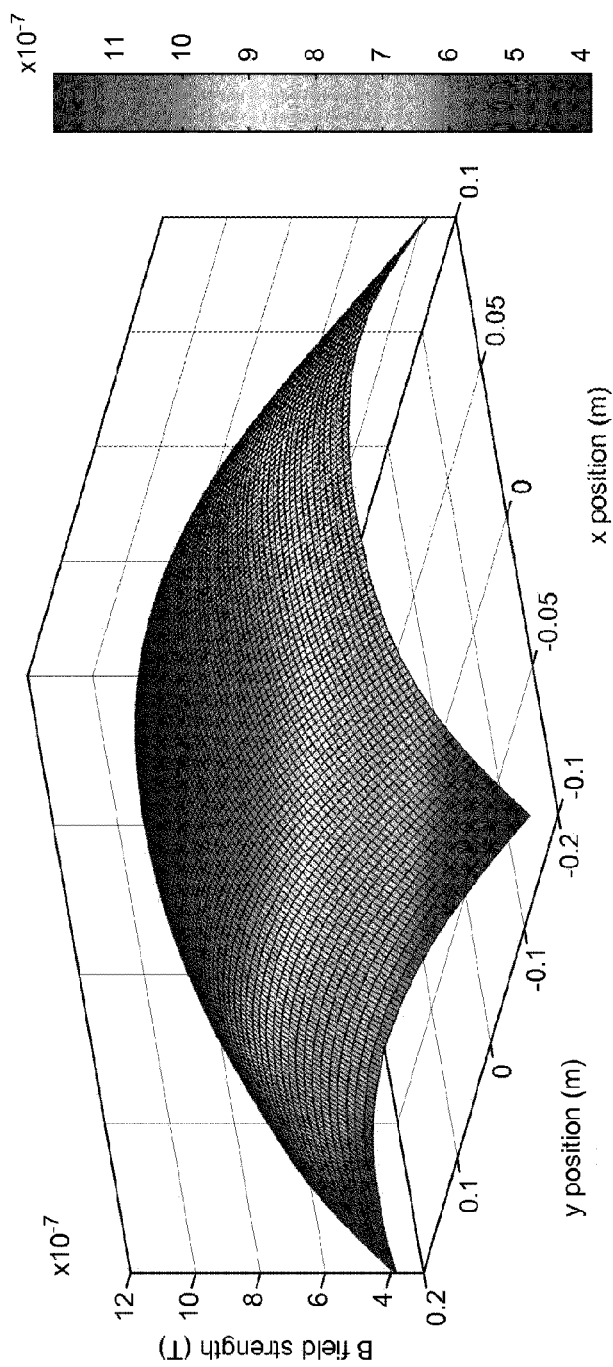
FIG. 26b shows magnetic field distribution for a displacement 170 mm from coil centre (mouse cage)
Figure 26C:
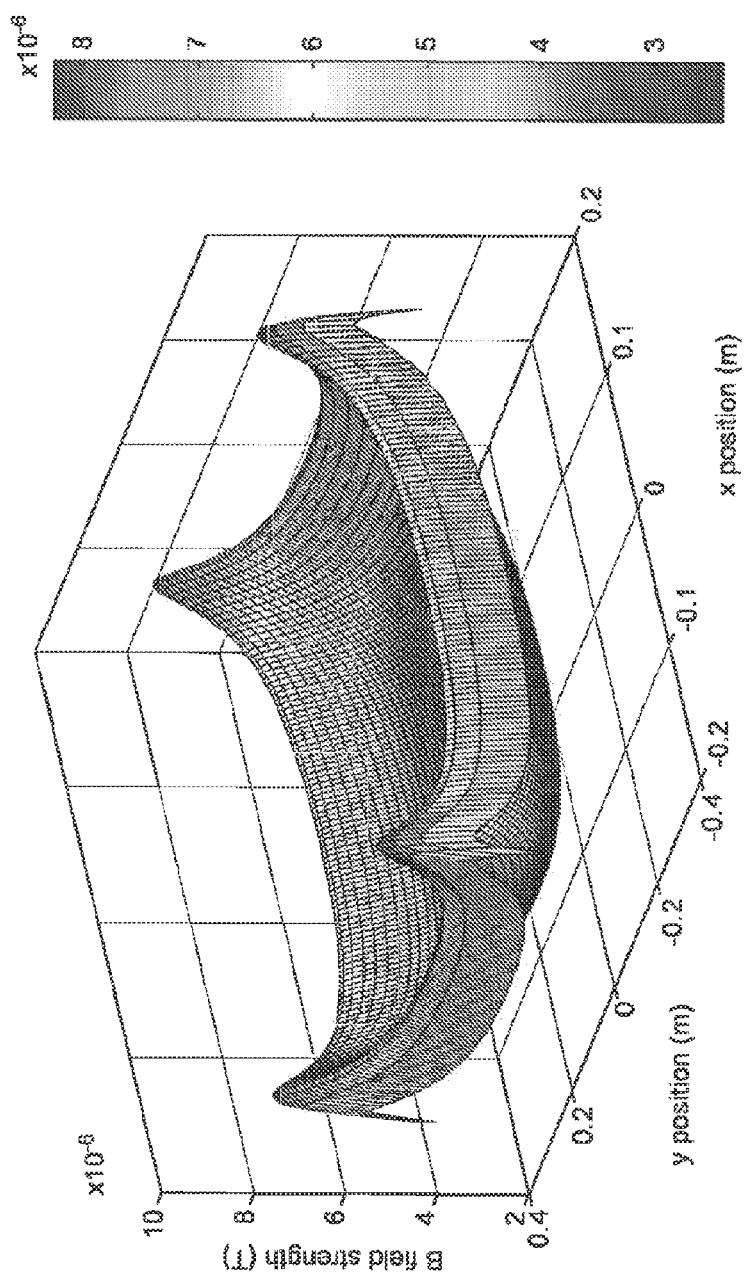
FIG. 26c shows magnetic field distribution for displacement of 20 mm from coil centre (rat cage)
Figure 26D:
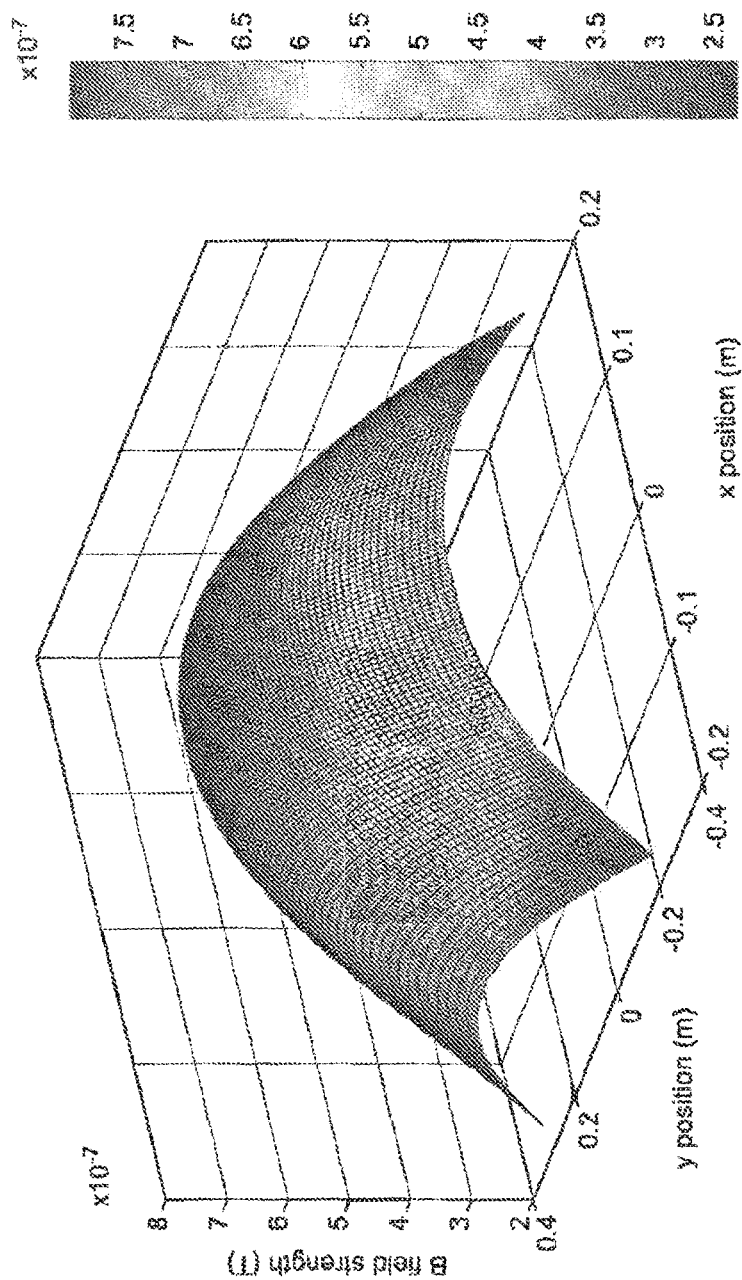
FIG. 26d shows magnetic field distribution for displacement 170 mm from coil centre (rat cage)

The results shown in FIG. 24a compare favourably with published research, achieving almost 2× the Q factor of optimised PCB coils at 3 MHz that are of 40 mm diameter at 3 MHz. Litz wire, that is, multiple twisted thin wire conductors which is well known to the skilled reader and not described in detail here but available from www.litz-wire.com, is found to offer a small advantage in Q factor over equivalent diameter solid wire; to mitigate the reduced conductor area available in such finely stranded insulated wire, a 170 mm diameter Rx coil is used using a 3D printed ABS former loaded with 3 overlayed parallel connected litz wires comprising 6 turns of conduction at 1.5 mm spacing comprising 3 strands of 1.3 mm Litz wire shown in FIG. 24b). Due to its greater Q factor (280 at 3 MHz) and 72× greater area than the miniaturised coils, the arrangement receives greater than a mW up to 7 m from the Tx coil. To obtain an estimate of the power transferred not taking into account the environment the coil is placed in, the mutual inductance has been estimated via the loop areas of the antennas using:

$$M_{TxRx} = \frac{\mu_0 A_{Tx} A_{Rx}}{2r^3} \quad (5)$$

Where $A_{TX}$, $A_{RX}$ are the sum of the areas of the turns for the Tx and Rx coils respectively and r is the on axis displacement of the coils.

It will be recognised that in addition to optimising coil design, which can be achieved in any appropriate manner including the embodiment outlined above, design of the transmit and proceed circuit is an additional significant consideration. In particular it is found that an arrangement including a class-E amplifier on the transmit side of the type described above, together with class-E rectifier on the receive side again of the type described above, taken in conjunction with optimised coil design and enhanced tuning parameters gives surprising and unprecedented results in relation to long range inductive power transfer system with a range of multiple meters.

Amongst the contributing factors are the high frequencies and corresponding efficiency available, the ability to accept a sinusoidal input current at the receiver end, the ability to meet high voltage requirements at the transmitter end without requiring additional componentry or compensation for capacitance which in turn permits fast switching, the ability to accept a high impedance load and the high Q factor attainable with a class-E receiver rectifier design including a receiver coil using Litz wire woven or mounted on a flexible substrate such as Kapton or cloth providing the flexible structure and mounting described above. All these factors contribute to enhanced long range operation and support a further significant factor, namely the ability of a class-E amplifier to support a free wheeling mode at the transient side under the power/voltage/frequency conditions required without burnout, and the ability of a class-E rectifier to operate under the receive conditions without burnout.

In a conventional IPT system, where efficiency is >50%, the Rx coil reflected impedance makes up the majority of the primary tank impedance formed between the Tx coil and its tuning capacitor and the systems are tuned accordingly as discussed in more detail above. As this varies with position and Rx load, the Class-E amplifier must be retuned for optimal efficiency for example by verifying the clock frequency in on the semi-resonant embodiments disclosed herein. However, with the long-range system addressed herein, the Rx coil is so weakly coupled that it has negligible effect on the Tx coil impedance, allowing both design and operation to be modified accordingly. In particular, for a given Tx tank, the driver clock frequency and the DC power supply are tuned for maximum wireless power transfer efficiency, without factoring in reflected impedance.

Furthermore, the impedance match $Z_{tank}$ for the Rx coil can be simplified similarly, as the coupling with the Tx is negligible, to the conjugate match of the Rx tank at the operating frequency:

$$Z_{tank} = \frac{1}{\frac{1}{R_{Rx} + j\omega L_{Rx} + j\omega C} + j\omega C} \quad (6)$$

Where $R_{Rx}$ is the series loss resistance of the Rx coil, $L_{Rx}$ the inductance of the Rx coil and C the turning capacitance used to resonate the LC tank at the system's operating frequency.

Simulation supports the effectiveness of this arrangement as this model makes use of the coil's loss resistance, the Q factor measurements of the coils can be verified by checking that the calculated impedance match is optimal. The match should be resistive at resonance, since the tank presents a real impedance; again enhanced because of negligible coupling with the Tx side. $M_{TxRx}$ can be found using the measured magnetic field generated by the circulating current from a free wheeling primary $I_{Tx}$ and the area A of flux that the Rx coil encloses (i.e. sum of areas of all turns). The free wheeling coil current can be found using the coil voltage and the impedance of the Tx coil (from inductance and Q factor measurements) or by approximating the coil as line segments of current and measuring the magnetic field at a known close location to the Tx coil (e.g. 1 m away on axis).

$$M_{TxRx} = \frac{A_{Rx} B}{I_{Tx}} \quad (7)$$

This methodology allows for prediction of system efficiency in real-world environments where the magnetic field strength is modified by conductive objects.

Using the arrangement described, it is found that unprecedented long distance inductive power transfer is achieved with significantly high level maximum power input limited only by the voltage rating of the class-E amplifier MOSFET resulting from the high impedance of the free-wheeling transmit coil.

It will be seen, therefore, that a practical long range inductive power transfer system is provided using a semi-resonant class-E driver and transmit coil, megahertz transmitter frequency, a semi-resonant primary and resonant secondary coil together with the coil constructions disclosed.

The range of potential applications for the long range IP technology is significant including powering sensors and actuators in industrial scenarios, offices or homes, powering implantable and external medical devices, and powering sensors, actuators or tools in underwater, field or space applications, powering system components in machinery. Additionally, aspects of the design can used in other configurations, for example the coil configuration described in more detail below can be used in a range of long and short range implementations.

For example, in one embodiment illustrating possible usages of the techniques described herein, a magnetic system is provided for powering of EEG devices in rodents. In a cage of base 200 mm×400 mm, height 150 mm (mouse) or 400 mm by 500 mm and height 250 mm (rat), a planar transmit coil in the form of a flat spiral having total depth 25 mm, coil boundary dimensions 240 mm by 440 mm (mouse), 440 mm×560 mm (rat) and formed of 10 mm diameter copper microbore pipe is provided below the base of the cage for example at a distance of 20 mm from coil centre. As discussed in more detail below, this provides a target receive power within the cage of 10 mW with a maximum received power of 100 mW over a maximum sustained angular displacement from the aligned case of 45 degrees.

Figure 27:
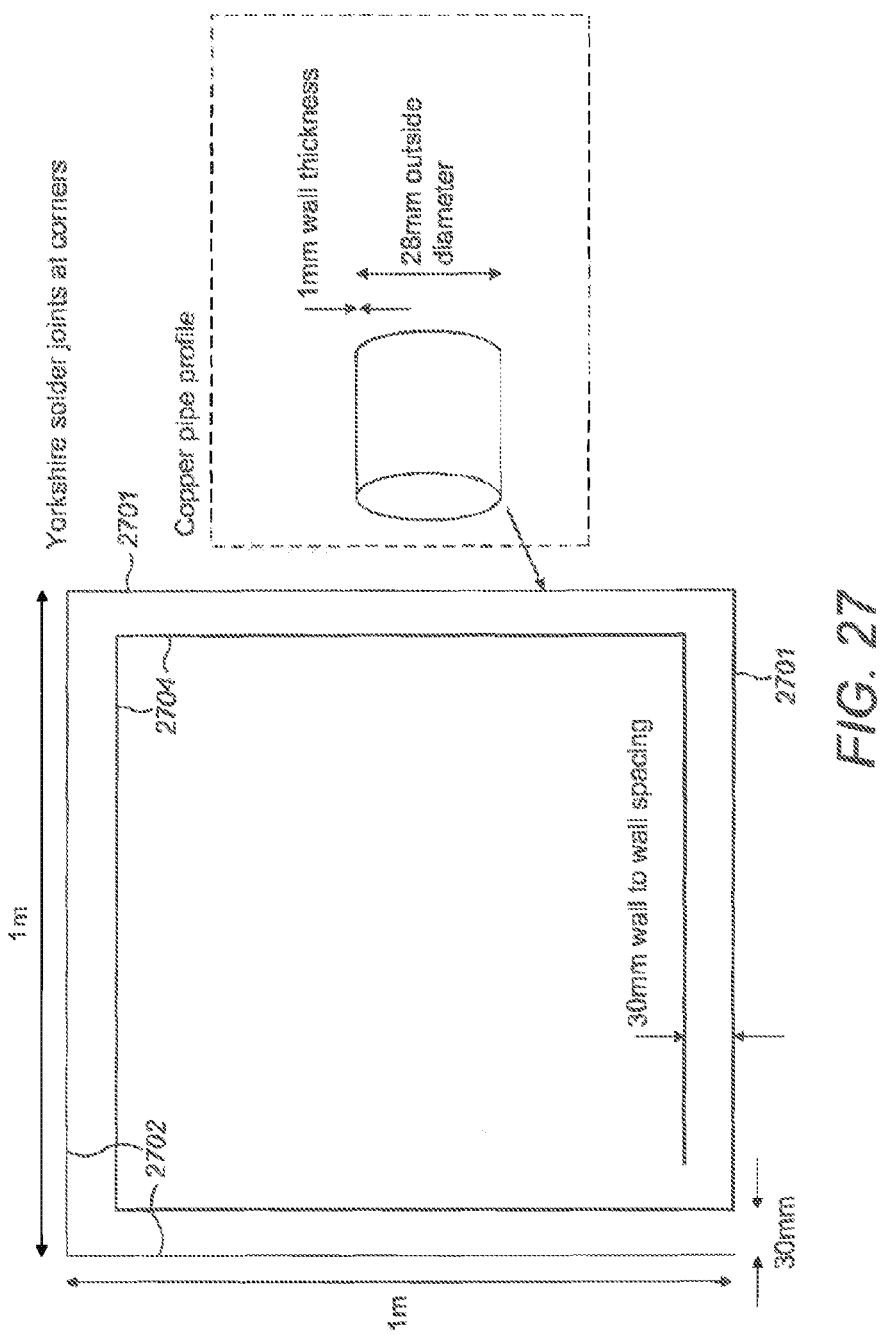
FIG. 27 shows a potential transmit coil configuration.
Figure 28:
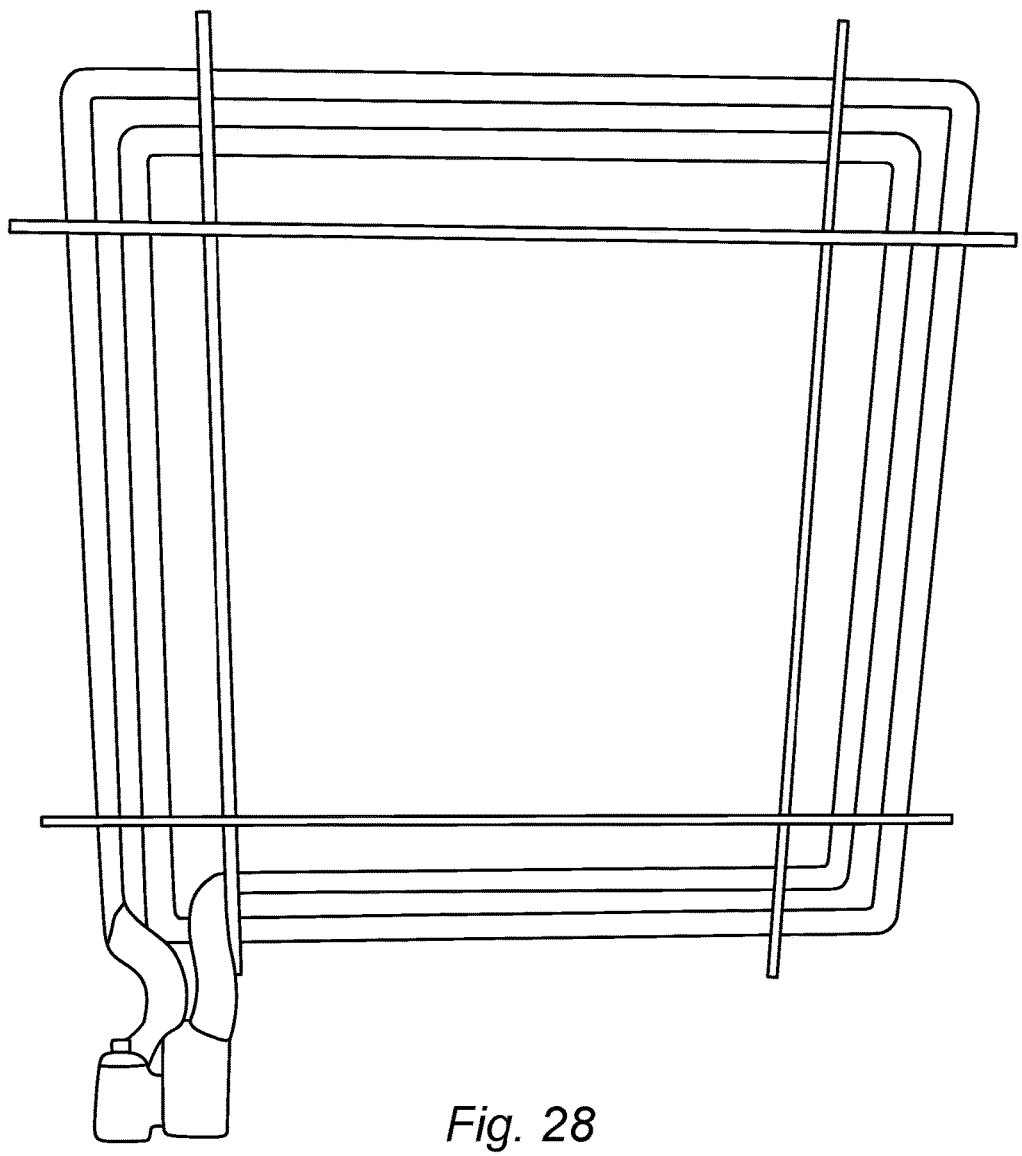
FIG. 28 shows a 1 m Tx coil and class-E amplifier.
Figure 29:
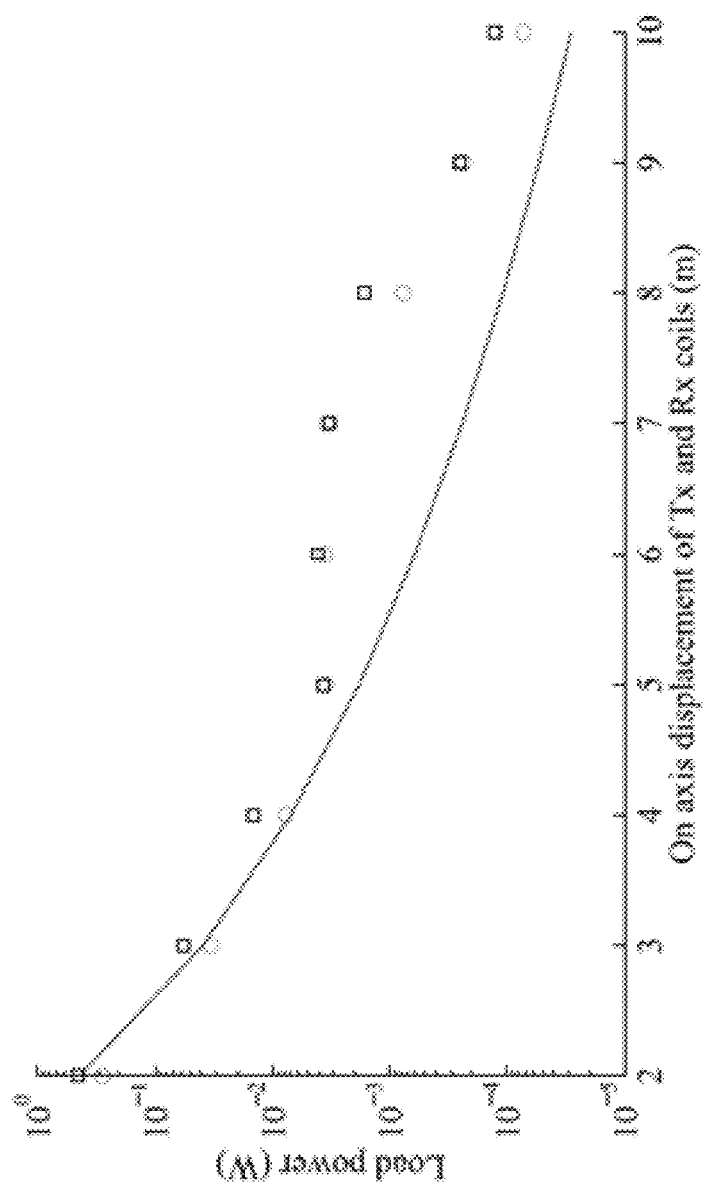
FIG. 29 shows a graphical simulation of a load power transferred to 170×170 mmRx coil from 1×1 m Tx coil with 98 W DC power input to Tx amplifier.
Figure 30:
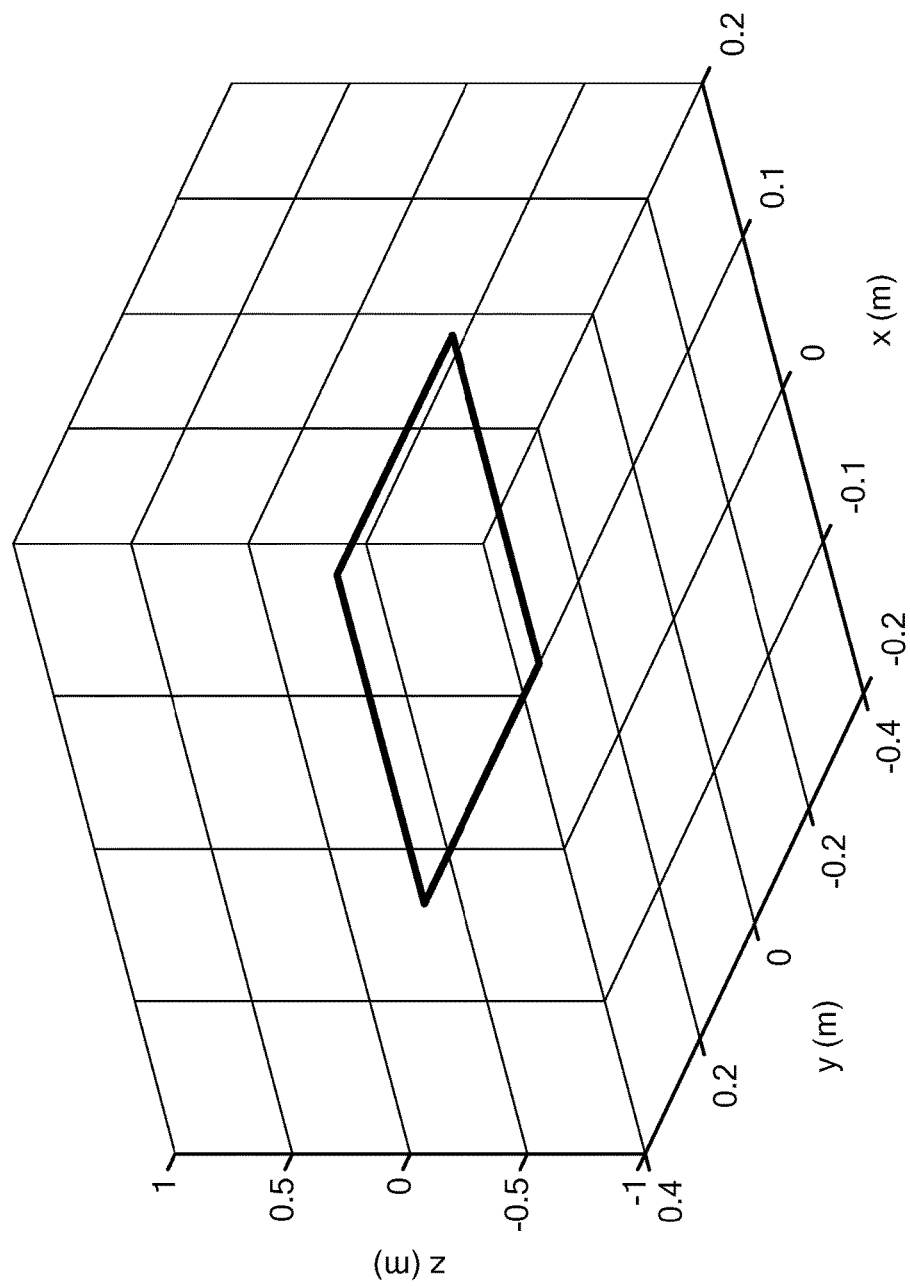
FIG. 30 shows a mouse cage transmit coil.
Figure 31A:
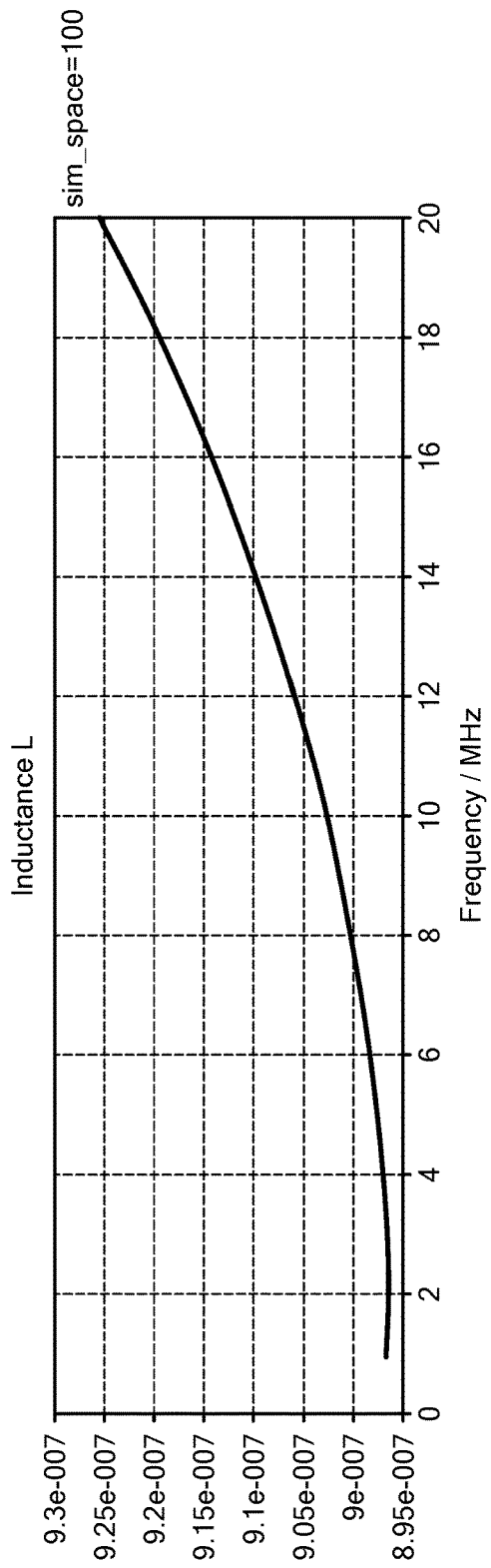
FIG. 31A shows a first full wave EM simulation of a mouse Tx coil.
Figure 31B:
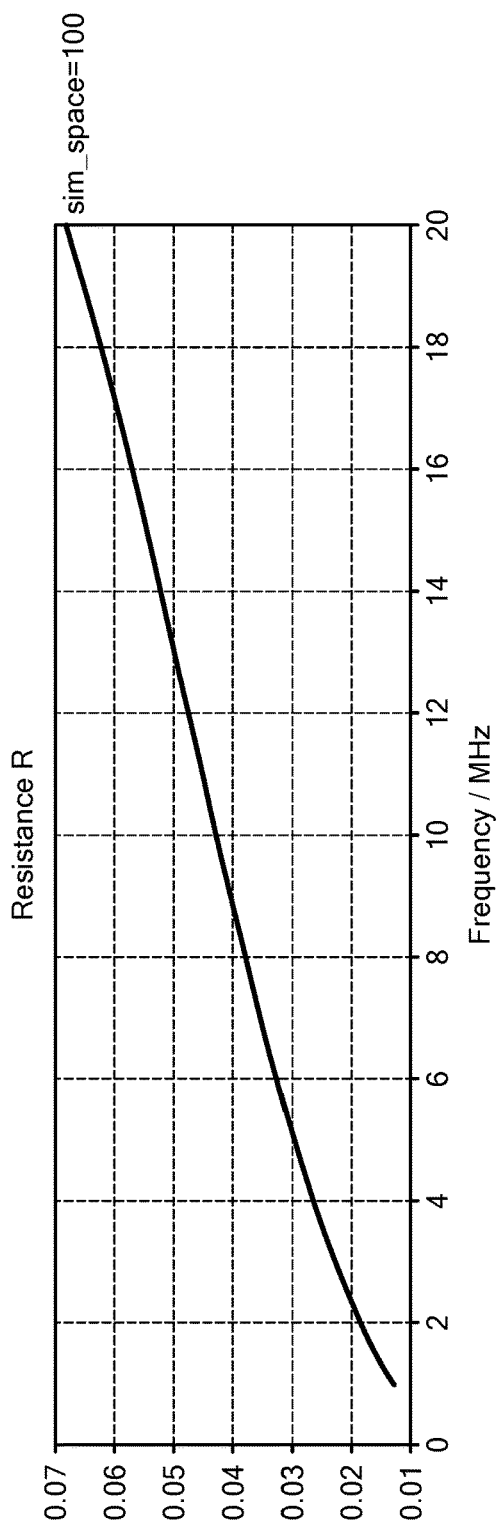
FIG. 31B shows a second full wave EM simulation of a mouse Tx coil.
Figure 31C:
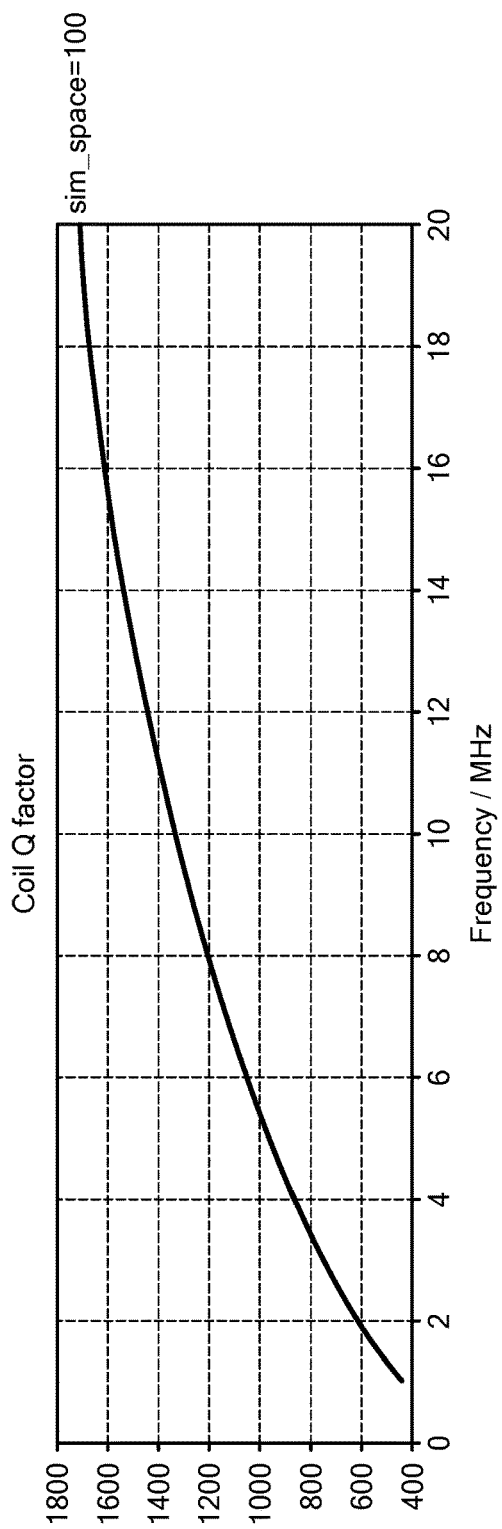
FIG. 31C shows a third full wave EM simulation of a mouse Tx coil.
Figure 32A:
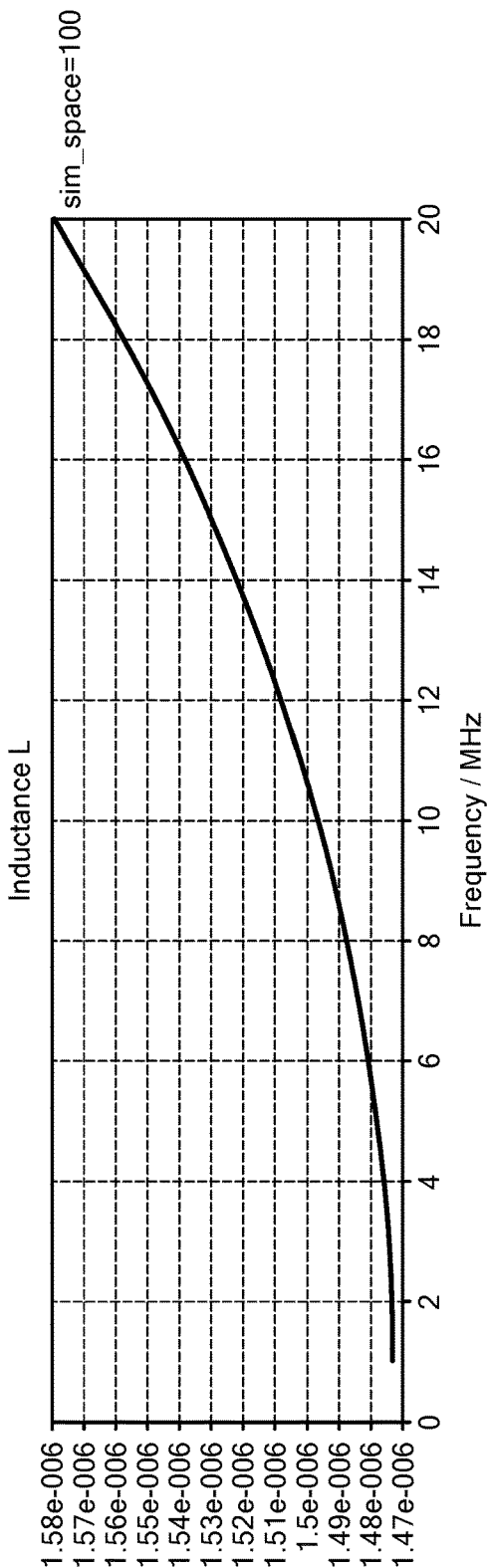
FIG. 32A shows a first full wave EM simulation of a rat Tx coil.
Figure 32B:
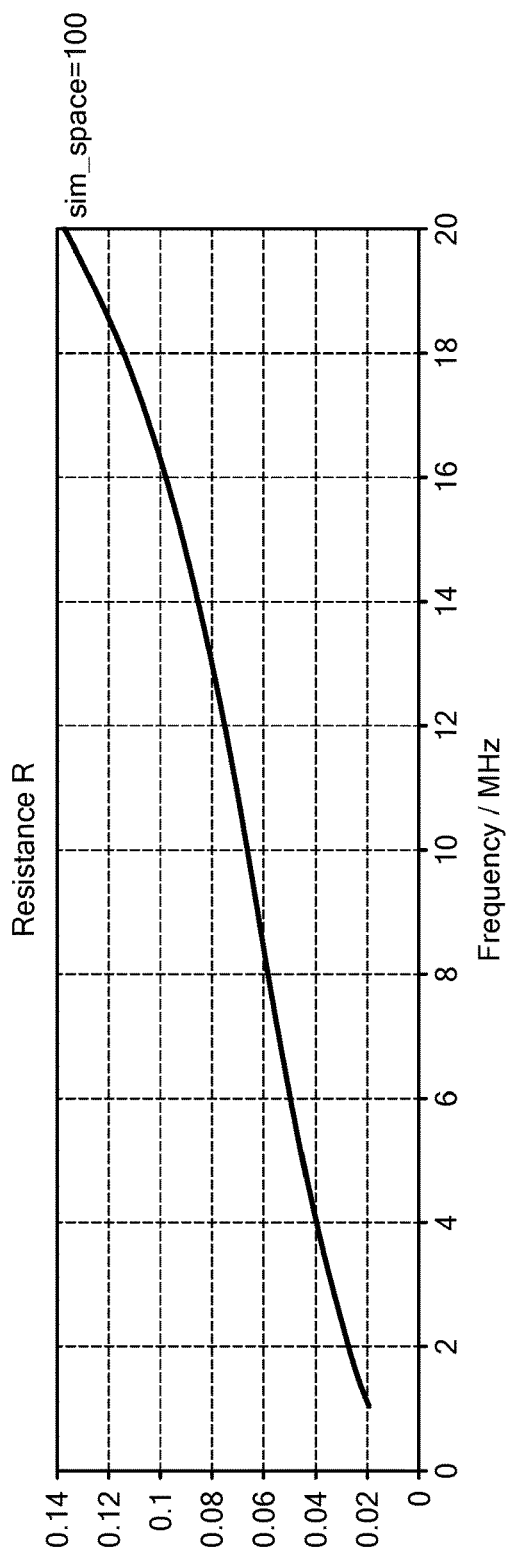
FIG. 32B shows a second full wave EM simulation of a rat Tx coil.
Figure 32C:
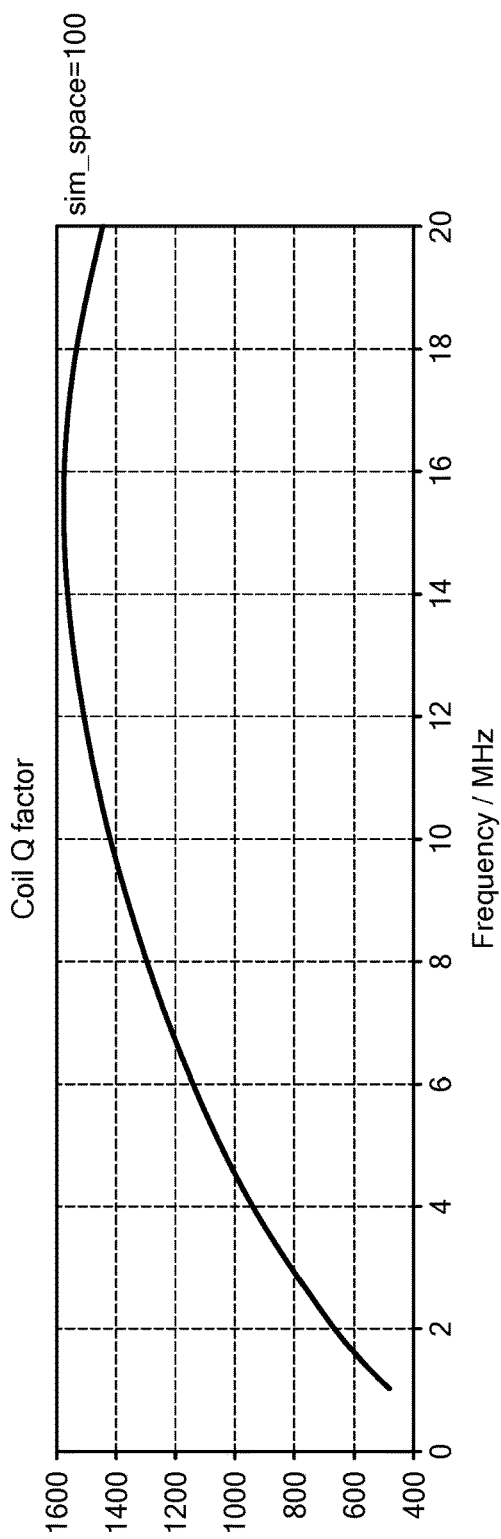
FIG. 32C shows a third full wave EM simulation of a rat Tx coil.
Figure 33:
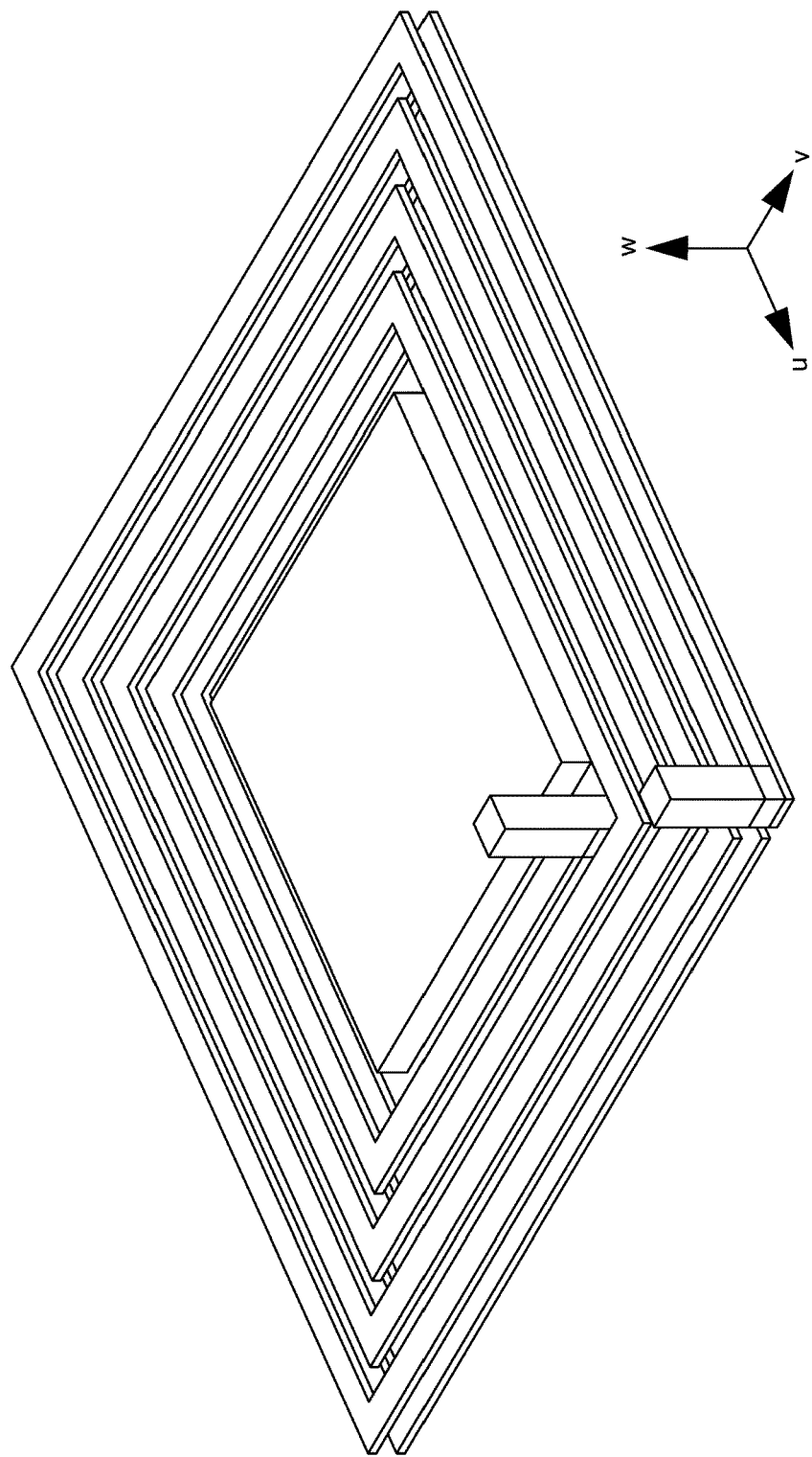
FIG. 33 shows a mouse Rx coil.
Figure 34A:
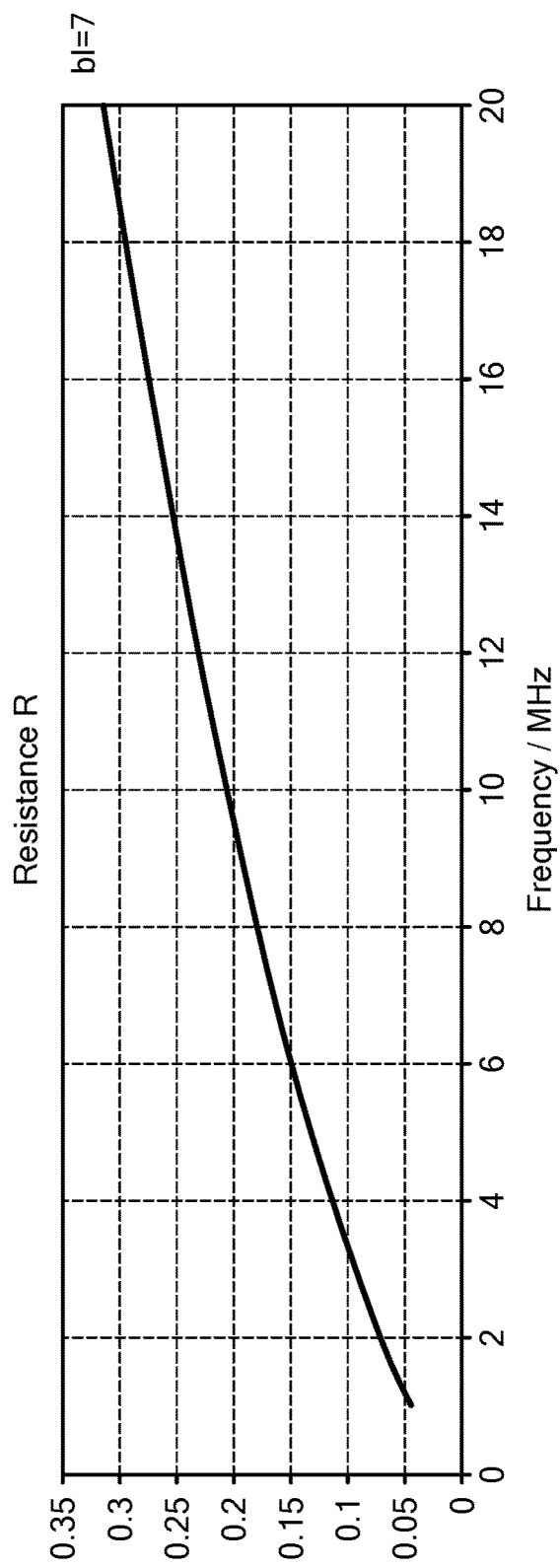
FIG. 34A shows a graphical representation of resistance in terms of operating frequency in a mouse Rx coil.
Figure 34B:
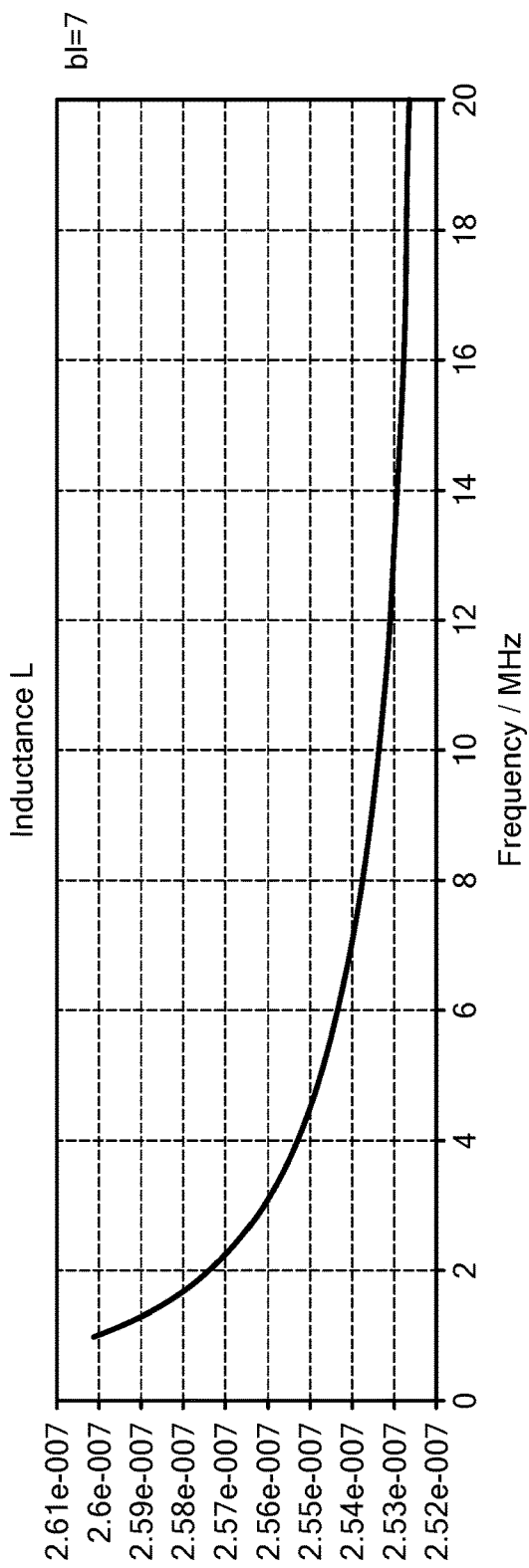
FIG. 34B shows a graphical representation of inductance in terms of operating frequency in a mouse Rx coil.
Figure 34C:
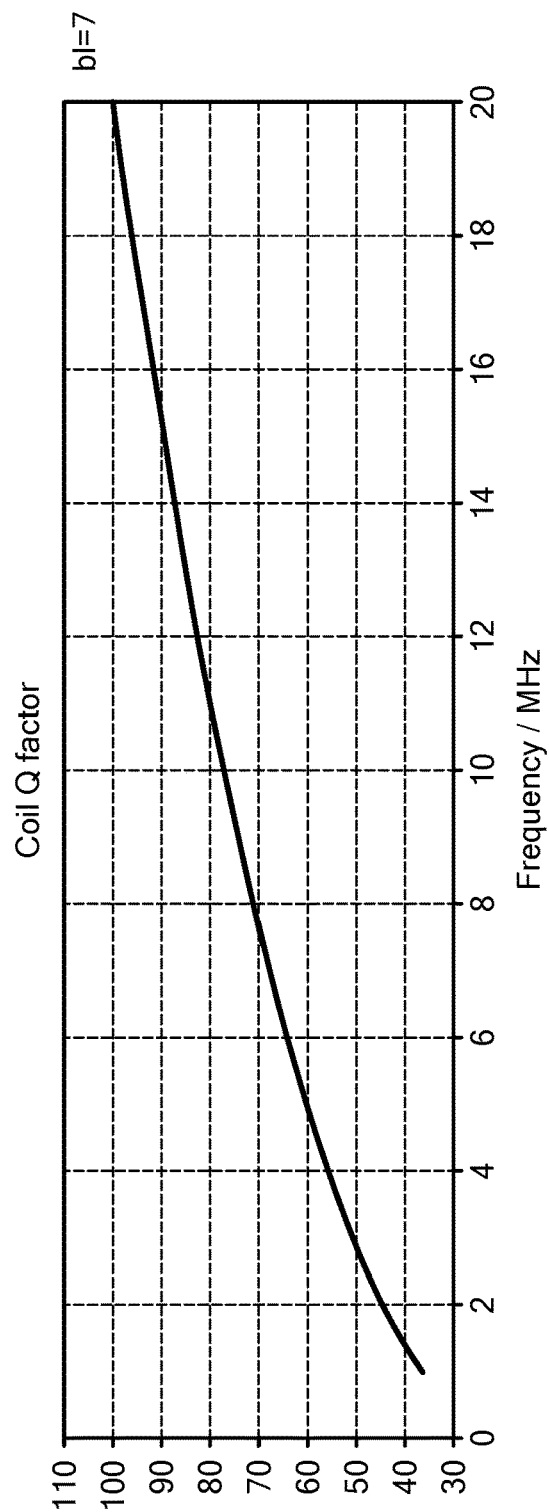
FIG. 34C shows a graphical representation of a col Q factor in terms of operating frequency in a mouse Rx coil.
Figure 35A:
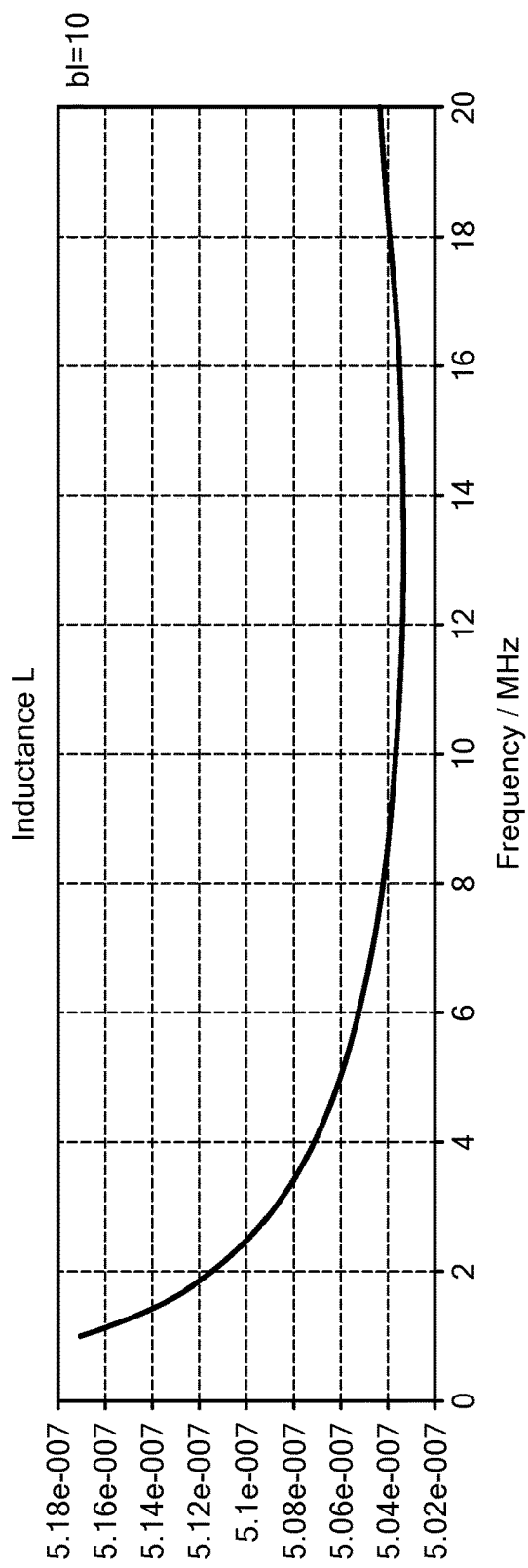
FIG. 35A shows a graphical representation of inductance in terms of operating frequency in a rat Rx coil.
Figure 35B:
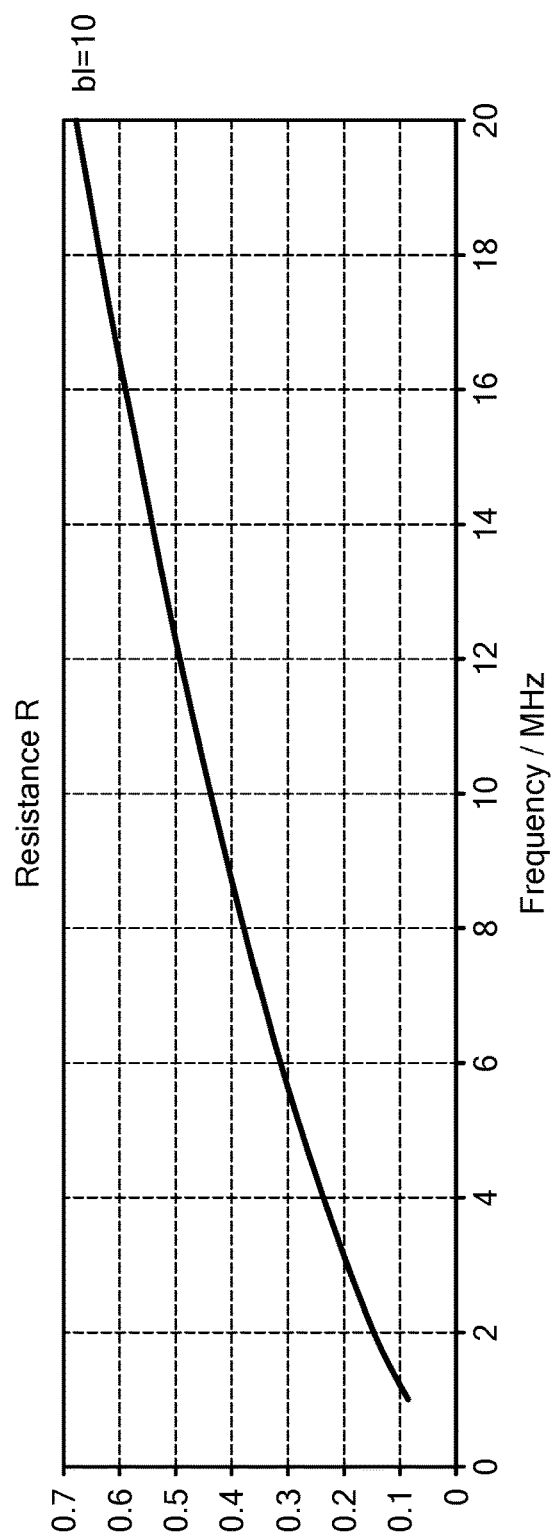
FIG. 35B shows a graphical representation of resistance in terms of operating frequency in a rat Rx coil.
Figure 35C:
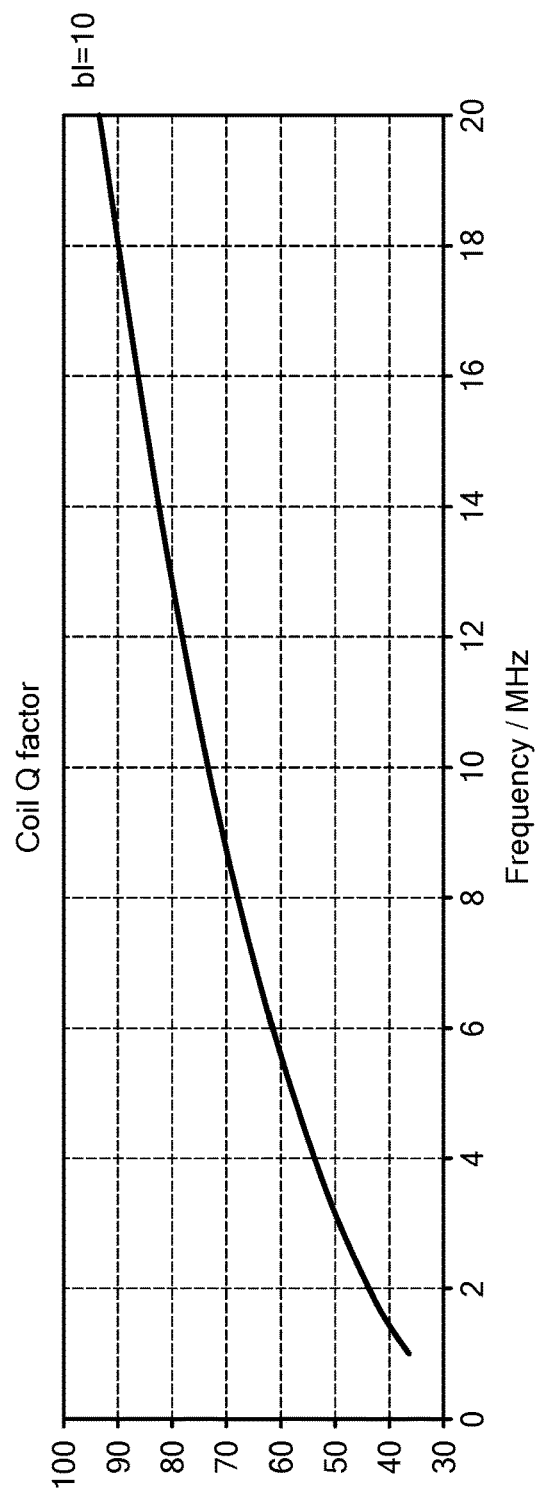
FIG. 35C shows a graphical representation of a col Q factor in terms of operating frequency in a rat Rx coil.
Figure 36:
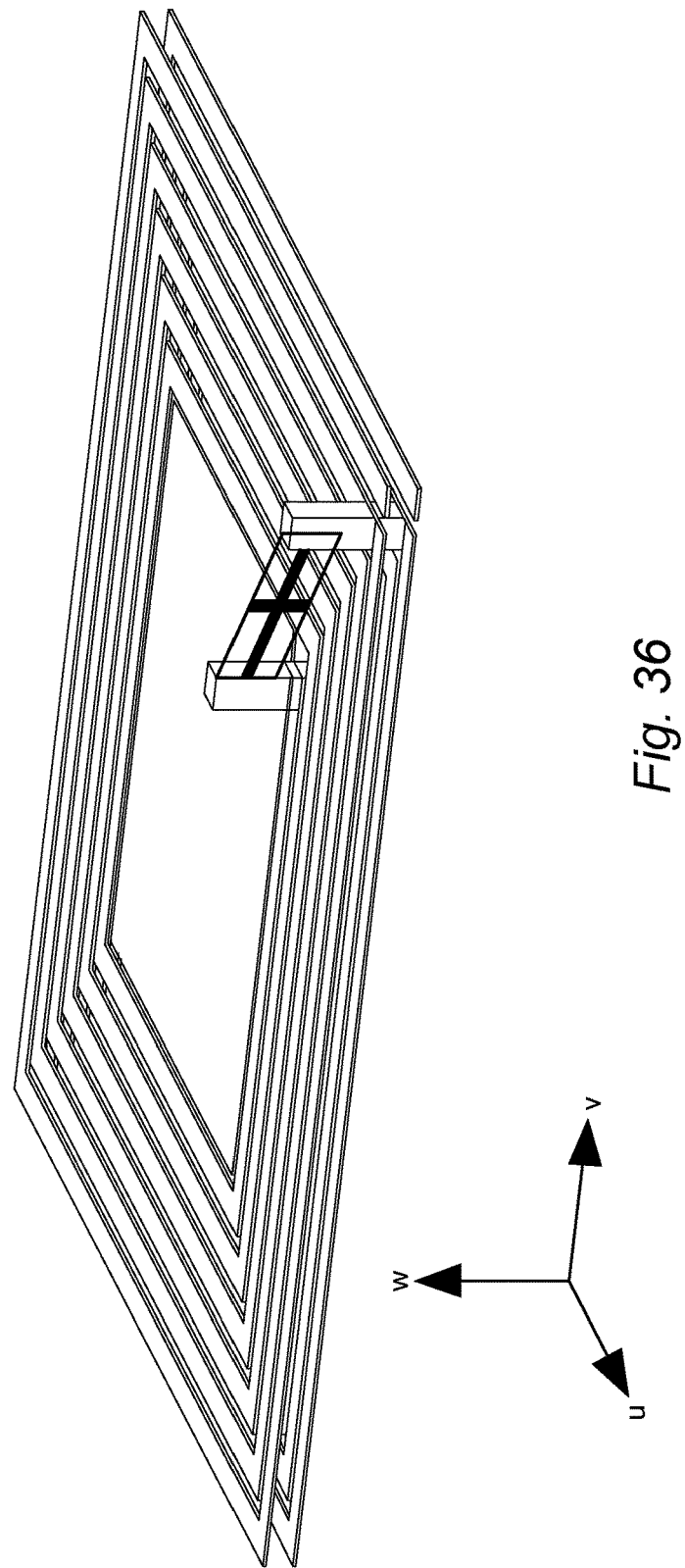
FIG. 36 shows a Rat Rx coil.

As shown in FIG. 27, the transmitter coil can be a single loop to ensure the most even field distribution while allowing high operating frequency as it is not electrically long. For example the coil can be generally flat and square with sides 2701 of 1 m, formed of hollow copper pipe forming a square spiral with outer loop 2702 and inner loop 2704, spaced by 30 mm and joined by an internal capillary joint such as a Yorkshire solder joint at the corners. In an embodiment the pipe has 28 mm outer diameter and 1 mm wall thickness.

The receive coils can be configured in this arrangement to be of minimal size and weight and hence suitable for unobtrusive mounting on the rodent. In the case, for example of the mouse receive coil as shown in FIG. 25, dimensions of a base of 15×15 mm and height of 5 mm are possible with a weight of 1 gram. As can be seen two parallel connected layers of flexible PCB material 2501, 2502 are provided with a square of electromagnetic shielding material such as IRJO4 ferrite 2503 in the centre to increase mutual coupling to the transmitter. The ferrite shield diameter dimensions can be 10 mm×10 mm and of depth 0.5 mm. The shield thickness determines the layer spacing such that any other spacing can be obtained as desired, by using different ferrites. Each coil layer 2501, 2502 comprises a flat, square spiral of copper trace, depth 0.035 mm, width 0.6 mm, separation 0.3 mm, with four turns.

The embodiments described provide multiple benefits. The flat spiral arrangement allows the use of PCB construction techniques and material whilst using less volume and the square profile provides ease of construction. The parallel connected layers increases coil Q factor as layers mutually couple increasing inductance beyond that of two identical coils connected in parallel but without mutual coupling.

The core dimensions can of course be varied as appropriate. For example for a rat receive coil the turn separation and number of turns may be varied for example to 0.25 mm and 5 mm respectively, and the dimensions may be expanded to a base of 20 mm×20 mm and height 7 mm giving a weight of approximately 2 grams.

The system provides enhanced performance which can be modelled as set out below.

Using the coil loss resistance we can calculate the current flowing in the coil for a particular input power. We can then estimate the mutual coupling using the approximation of equation (7) on amperian loops enclosing flux:

$$A_{Rx} = N_{Rx} R_{avg}^2 \qquad (8)$$

We can then calculate the coupling factor from equation (4), and then use the link efficiency equation to work out the fractional link efficiency from equation (1)

The resulting values, assuming that the system is excited at its resonant frequency, shows that with an input of 1876 watts (mouse) or 1901 watts (rat), received power of at least 10 mW can be obtained at any point within the cage. However for power input of 10 mW for a received location at the cage floor input powers as little as 8 watts (mouse) and 4 watts (rat) are required. To provide high power level coverage throughout the cage volume, the use of a Helmholtz coil arrangement would reduce the transmit power requirements to 30 watts.

The effectiveness of the arrangement can further be understood with reference to the magnetic field strength distribution for the disclosed arrangement, as simulated in FIGS. 26a to 26d. In particular, for 1 A circulating current in the $T_x$ coil the best case z component of the magnetic field is 8.5401 e-06 T located near (but not at) the corners of the cage. The worst case magnetic field is: 3.8759e-07 T at the top corners of the cage. For these simulations the coil generating field is assumed to be made of filamentary wires (have no radius), the real diameter of the wires will have little effect on the field distribution at the top of the cage. The base of the cage is placed 20 mm above the centre of the coil giving a total coil depth of ~25 mm. This allows for the coil to be insulated and for a more homogenous field at the base of the cage than if the coil was located closer to the base of the cage; lessening the variability in operating conditions any power electronics would be subjected to. In the future this also gives sufficient depth for incorporation of drive electronics within the base.

It will be seen that by selecting an optimum operating frequency, performance can be enhanced; both primary and secondary coils will be operating below their radiation corner frequency due to the very small size of the secondary coils and the single turn nature of the primary. Therefor operating frequency should be maximised to maximise transfer efficiency. 5.5 MHz operating frequency is selected as gate drive losses are approximately 4 W using the class-E amplifier design so as to not have excessive gate drive dissipation.

It will be appreciated that the approaches described herein can be applied to any appropriate IPT system with desired ranges, power requirements and operating conditions, and for any appropriate implementation.

According to preferred aspects there is provided:
1. An inductive power transfer system comprising:
   a transmitter coil and a receiver coil spaced from the transmitter coil;
   a transmitter circuit comprising the transmitter coil; and
   a receiver circuit comprising the receiver coil,
   wherein the transmitter circuit is in the form of a Class E amplifier comprising:
   a first inductor and a transistor in series between the terminals of a power supply, the transistor being arranged to switch at a first frequency;
   a first transmitter capacitor in parallel with the transistor between the first inductor and a power supply terminal;
   a primary tank circuit in parallel with the first transmitter capacitor, the primary tank circuit comprising the transmitter coil and a second transmitter capacitor arranged in parallel or series with the transmitter coil;
   a third transmitter capacitor in series with the first inductor between the first transmitter capacitor and the primary tank circuit.
2. An inductive power transfer system as 1, wherein the capacitance of the second transmitter capacitor is selected, such that the resonant frequency of the primary tank circuit is greater than the first frequency.
3. An inductive power transfer system as 1, wherein the capacitance of the second transmitter capacitor is selected, such that the resonant frequency of the primary tank circuit is less than the first frequency.
4. An inductive power transfer system as 2 or 3, wherein the ratio of the first frequency to the resonant frequency of the primary tank circuit is in the range 0.5 to 1.5.
5. An inductive power transfer system as 2, wherein the ratio of the first frequency to the resonant frequency of the primary tank circuit is in the range 0.7 to 0.9.
6. An inductive power transfer system, wherein the receiver circuit has a resonant frequency and the transmitter circuit is configured to vary the first frequency, in order to achieve a desired effective impedance of the primary tank circuit.
7. An inductive power transfer system, wherein the transmitter coil and/or the receiver coil has an air core.
8. An inductive power transfer system, wherein the transmitter coil and/or the receiver coil has a diameter of at least 5 cm, preferably at least 10 cm.
9. An inductive power transfer system, wherein the spacing between the transmitter coil and the receiver coil, in use, is at least 15 cm.
10. An inductive power transfer system, wherein the transistor is a MOSFET.
11. An inductive power transfer system, wherein the first frequency is at least 80 kHz, preferably at least 1 MHz.
12. An inductive power transfer system, wherein the power transferred between the transmitter coil and the receiver coil is at least 1 watt, preferably at least 10 watts.
13. An inductive power transfer system, wherein the receiver circuit comprises a Class E rectifier.
14. An inductive power transfer system as 13, wherein the receiver circuit comprises a first receiver capacitor arranged in parallel with a load, in use, and a secondary tank circuit in parallel with the first receiver capacitor, wherein the secondary tank circuit comprises the receiver coil and a second receiver capacitor arranged in parallel with the receiver coil, and a first diode is provided between the secondary tank circuit and the first receiver capacitor.
15. An inductive power transfer system as 14, wherein the capacitance of the second receiver capacitor is selected such that the resonant frequency of the secondary tank circuit differs from the first frequency, whereby the secondary tank circuit operates in semi-resonance and maintains some reactive impedance.
16. An inductive power transfer system as 15, wherein the ratio of the first frequency to the resonant frequency of the secondary tank circuit is in the range 0.2 to 3.
17. An inductive power transfer system as 13 to 16, wherein the only inductor in the receiver circuit is the receiver coil.

18. An inductive power transfer system as 14 to 17, wherein the receiver circuit comprises at least a second diode in parallel with the first diode.
19. An inductive power transfer system as 13 to 18, wherein the only capacitance in parallel with the diode(s) is provided by the junction capacitance of the diode(s).
20. An inductive power transfer system as 13 to 19, wherein the diode(s) are silicon carbide diodes, gallium nitride diodes or are formed of other wide band gap material.
21. The receiver circuit of the inductive power transfer system as 14 to 20.
22. The transmitter circuit of the inductive power transfer system.

REFERENCES

[1] N. Tesla, "Apparatus for transmitting electrical energy," U.S. Pat. No. 1,119,732, 1914.
[2] K. V. Schuylenbergh and R. Puers, Inductive Powering: Basic Theory and Application to Biomedical Systems. Springer, July 2009.
[3] S. Y. R. Hui and W. C. Ho, "A new generation of universal contactless battery charging platform for portable consumer electronic equipment," in *Power Electron. Specialists Conf., 2004. PESC 04. 2004 IEEE 35th Annual*, vol. 1, June 2004, pp. 638-644.
[4] D. Schneider, "Wireless power at a distance is still far away [electrons unplugged]," *Spectrum, IEEE*, vol. 47, no. 5, pp. 34-39, May 2010.
[5] G. Covic, G. Elliott, O. Stielau, R. Green, and J. Boys, "The design of a contact-less energy transfer system for a people mover system," in *Proc. PowerCon 2000., Int. Conf. on Power Syst. Tech.*, vol. 1, 2000, pp. 79-84.
[6] M. Budhia, G. A. Covic, and J. T. Boys, "Design and optimization of circular magnetic structures for lumped inductive power transfer systems," *IEEE Trans. Power Electron.*, vol. 26, no. 11, pp. 3096-3108, November 2011.
[7] A. Karalis, J. D. Joannopoulos, and M. Soljacic, "Efficient wireless non-radiative midrange energy transfer," *Annals of Physics*, vol. 323, no. 1, pp. 34-48, 2008.
[8] B. Wang, K. H. Teo, T. Nishino, W. Yerazunis, J. Barnwell, and J. Zhang, "Experiments on wireless power transfer with metamaterials," *Applied Physics Letters*, vol. 98, no. 25, June 2011.
[9] A. Kurs, A. Karalis, R. Moffatt, J. D. Joannopoulos, P. Fisher, and M. Soljacic, "Wireless power transfer via strongly coupled magnetic resonances," *Science*, vol. 317, no. 5834, pp. 83-86, July 2007.
[10] S. H. Lee and R. D. Lorenz, "Development and validation of model for 95% efficiency, 220 W wireless power transfer over a 30-cm air-gap," *IEEE Trans. on Ind. Appl.*, vol. 47, no. 6, pp. 2495-2504, September 2011.
[11] N. Y. Kim and K. Y. Kim, "Automated frequency tracking system for efficient mid-range magnetic resonance wireless power transfer," *Microwave and Optical*, vol. 54, no. 6, pp. 1423-1426, June 2012.
[12] Z. N. Low, R. Chinga, R. Tseng, and J. Lin, "Design and test of a high power high efficiency loosely coupled planar wireless power transfer system," *IEEE Trans. Ind. Electron.*, vol. 56, no. 5, pp. 1801-1812, May 2009.
[13] J. J. Casanova, Z. N. Low, and J. Lin, "Design and optimization of a Class-E amplifier for a loosely coupled planar wireless power system," *IEEE Trans. on Circuits and Syst. II: Express Briefs*, vol. 56, no. 11, pp. 830-834, November 2009.
[14] "Plugless Power," February 2012. [Online]. Available: http://www.pluglesspower.com/
[15] T. P. Duong and J. W. Lee, "Experimental results of high-efficiency resonant coupling wireless power transfer using a variable coupling method," *IEEE Trans. Microw. Wireless Compon. Lett.*, vol. 21, no. 8, pp. 442-444, August 2011.
[16] J. L. Villa, J. Sallan, J. F. Sanz Osorio, and A. Llombart, "High misalignment tolerant compensation topology for ICPT systems," *IEEE Trans. Ind. Electron.*, vol. 59, no. 2, pp. 945-951, February 2012.
[17] "WiTricity Corp." February 2012. [Online]. Available: http://www.witricity.com/
[18] "Delphi wireless charging system," May 2012. [Online]. Available: http://delphi.com/shared/pdf/ppd/pwrelec/wireless-charging-system.pdf
[19] A. Karalis, A. B. Kurs, R. Moffatt, J. D. Joannopoulos, P. Fisher, and M. Soljacic, "Power Supply System and Method of Controlling Power Supply System," U.S. Pat. No. 20 110 221 278, 2011.
[20] L. Chen, S. Liu, Y. Zhou, and T. Cui, "An optimizable circuit structure for highefficiency wireless power transfer," *IEEE Trans. Ind. Electron.*, vol. PP, no. 99, pp. 1-1, December 2011.
[21] S. Ahn and J. Kim, "Magnetic field design for high efficient and low EMF wireless power transfer in on-line electric vehicle," in *Proc. of the 5th European Conf. on Antennas and Propag. (EUCAP)*, April 2011, pp. 3979-3982.
[22] J. J. Huh, S. W. Lee, W. Y. Lee, G. H. Cho, and C. T. Rim, "Narrow width inductive power transfer system for online electrical vehicles," *IEEE Trans. on Power Electron.*, vol. 26, no. 12, pp. 3666-3679, December 2011.
[23] "Qualcomm," February 2012. [Online]. Available: http://www.qualcomm.com/
[24] "HaloIPT," February 2012. [Online]. Available: http://www.haloipt.com/#n home-intro
[25] A. P. Sample, D. A. Meyer, and J. R. Smith, "Analysis, experimental results, and range adaptation of magnetically coupled resonators for wireless power transfer," *IEEE Trans. Ind. Electron.*, vol. 58, no. 2, pp. 544-554, February 2011.
[26] J. Garnica, J. Casanova, and J. Lin, "High efficiency midrange wireless power transfer system," in Microwave Workshop Series on Innovative Wireless Power Transmission: Technologies, Systems, and Applications (IMWS), 2011 IEEE MTT-S International, May 2011, pp. 73-76.
[27] D. C. Yates, A. S. Holmes, and A. J. Burdett, "Optimal transmission frequency for ultralow-power short-range radio links," *IEEE Trans. on Circ. and Syst. I: Regular Papers*, vol. 51, no. 7, pp. 1405-1413, July 2004.
[28] M. Pinuela, D. C. Yates, P. D. Mitcheson, and S. Lucyszyn, "Maximising the link efficiency of resonant inductive coupling for wireless power transfer," in *1st International Workshop on Wireless Energy Transport and Harvesting*, Eindhoven, The Netherlands, June 2011.
[29] D. Kajfez, S. Chebolu, M. R. Abdul-Gaffoor, and A. A. Kishk, "Uncertainty analysis of the transmission-type measurement of Q-factor," *IEEE Trans. Microw. Theory Tech.*, vol. 47, no. 3, pp. 367-371, March 1999.
[30] C. A. Balanis, *Antenna Theory: Analysis and Design*, 3rd ed. John Wiley, 2005.
[31] S. Butterworth, "On the alternating current resistance of solenoidal coils," *Proceedings of the Royal Society of*

London. Series A, Containing Papers of a Mathematical and Physical Character, vol. 107, no. 744, pp. 693-715, April 1925.

[32] N. O. Sokal and A. D. Sokal, "Class E-A new class of high-efficiency tuned singleended switching power amplifiers," IEEE J. of Solid-State Circuits, vol. 10, no. 3, pp. 168-176, June 1975.

[33] N. O. Sokal, "Class-E RF power amplifiers," QEX Commun. Quart, no. 204, pp. 9-20, January 2001.

[34] M. W. Vania, "PRF-1150 1 KW 13.56 MHz Class E RF generator evaluation module," Directed Energy, Inc., Technical Note 9200-0255 Rev. 1,2002.

[35] "Agilent N2780A/B, N2781A/B, N2782A/B, and N2783A/B current probes, user's and service guide," Agilent Technologies Inc., U.S.A., 2010.

[36] S. Rea and S. West, "Thermal radiation from finned heat sinks," IEEE Trans. Parts, Hybrids, and Packag., vol. 12, no. 2, pp. 115-117, June 1976

The invention claimed is:

1. An inductive power transfer transmitter comprising:
   a class-E amplifier driver arranged to drive a primary tank circuit including a transmitter coil, in which the driver frequency is tuned to drive the primary tank circuit at semi-resonant frequency when the primary tank circuit is in an unloaded condition,
   wherein the primary tank circuit comprises the transmitter coil and a first capacitor arranged in parallel with the transmitter coil, and
   the inductive power transfer transmitter further comprises a second capacitor connecting the class-E amplifier driver to the primary tank circuit.

2. A transmitter as claimed in claim 1 in which the input DC voltage is additionally tuned to drive the primary tank circuit at maximum wireless power transfer efficiency when the primary tank is an unloaded condition.

3. A transmitter as claimed in claim 1 in which the driver frequency is different from the primary tank circuit resonant frequency.

4. A transmitter as claimed in claim 1 in which the driver frequency is further tuned to operate the primary tank circuit in a free wheel condition.

5. An inductive power transfer receiver comprising a receiver tank circuit and rectifier, in which the tank circuit is tuned for resonance in the absence of a remote load, wherein the rectifier comprises:
   a first diode having a first terminal and a second terminal, and
   connected between the first terminal and the second terminal of the first diode, a capacitor or a second diode.

6. A receiver as claimed in claim 5 in which the rectifier is a class-E rectifier.

7. A receiver as claimed in claim 5 in which the receiver tank circuit coil comprises Litz wire.

8. A receiver as claimed in claim 5 in which the receiver tank circuit coil comprises a planar spiral configuration.

9. A receiver as claimed in claim 7 in which the receiver coil is mounted on a PCB.

10. An inductive power transfer receiver comprising a planar spiral Litz wire configuration woven or mounted on a flexible substrate, the flexible substrate being Kapton, cloth, or a thin PCB material having a thickness of 100 μm or less.

11. An inductive power transfer system comprising:
    an inductive power transfer transmitter comprising a class-E amplifier driver arranged to drive a primary tank circuit including a transmitter coil, in which the driver frequency is tuned to drive the primary tank circuit at semi-resonant frequency when the primary tank circuit is in an unloaded condition,
    wherein the primary tank circuit comprises the transmitter coil and a first capacitor arranged in parallel with the transmitter coil, and
    the inductive power transfer transmitter further comprises a second capacitor connecting the class-E amplifier driver to the tank circuit; and
    an inductive power transfer receiver comprising a receiver tank circuit and rectifier, in which the tank circuit is tuned for resonance in the absence of a remote load.

12. An inductive power transfer system as claimed in claim 11 comprising a long range inductive power transfer system.

13. An inductive power transfer system as claimed in claim 11 comprising a planar transmitter coil forming a base over which a planar receiver coil can be positioned.

14. A system as claimed in claim 13 in which the transmitter coil is augmented with a Helmholtz coil.

15. A system as claimed in claim 13 in which the receiver coil comprises first and second planar spiral coils in parallel.

16. A system as claimed in claim 13 in which the transmitter coil comprises a single loop planar spiral.

17. A system as claimed in claim 13 in which at least one of the transmit and receive coils comprises a planar spiral coil around a central ferrite magnetic coupling element.

* * * * *